US012305518B2

(12) United States Patent
Minas et al.

(10) Patent No.: US 12,305,518 B2
(45) Date of Patent: May 20, 2025

(54) THERMAL BIAS CONTROL IN TURBOMACHINES

(71) Applicant: General Electric Company, Schenectady, NY (US)

(72) Inventors: Constantinos Minas, Slingerlands, NY (US); Harry Kirk Mathews, Jr., Clifton Park, NY (US); Gregory Alexander Natsui, Schenectady, NY (US); Lana Maria Osusky, Rexford, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 18/341,905

(22) Filed: Jun. 27, 2023

(65) Prior Publication Data

US 2023/0340888 A1   Oct. 26, 2023

Related U.S. Application Data

(63) Continuation of application No. 17/524,196, filed on Nov. 11, 2021, now Pat. No. 11,702,952.

(51) Int. Cl.
*F01D 19/02* (2006.01)
*F01D 25/12* (2006.01)

(52) U.S. Cl.
CPC ............. *F01D 19/02* (2013.01); *F01D 25/12* (2013.01); *F05D 2220/323* (2013.01);
(Continued)

(58) Field of Classification Search
CPC .......... F01D 19/02; F01D 21/12; F01D 25/12; F05D 2220/323; F05D 2260/232;
(Continued)

(56) References Cited

U.S. PATENT DOCUMENTS 8,820,046 B2   9/2014   Ross et al.
8,918,264 B2   12/2014  Jegu et al.
(Continued)

FOREIGN PATENT DOCUMENTS

EP   2006496 A1   12/2008
JP   H062570 A    1/1994
JP   H0626364 A   2/1994

OTHER PUBLICATIONS

Smith et al., A Study of Cranking Effectiveness as a Treatment for Rotor Thermal Bow in Gas Turbines, ISABE-2019-24025, Conference: International Society for Air Breathing Engines Conference 2019, Canberra Australia, Sep. 2019, 12 Pages.

*Primary Examiner* — Loren C Edwards
(74) *Attorney, Agent, or Firm* — Smith Gambrell & Russell LLP

(57) ABSTRACT

An engine control system may be configured to perform a method of controlling thermal bias in a turbomachine. An exemplary method may include determining a thermal bias-value for the turbomachine, and performing a cooling treatment based at least in part on the thermal bias-value. The thermal bias-value may include a difference between an upward temperature-value corresponding to a first one or more temperature measurements of an upward portion of the turbomachine and a downward temperature-value corresponding to a second one or more temperature measurements of a downward portion of the turbomachine. The cooling treatment may include at least one of: circulating air through at least a portion of the turbomachine, and rotating a shaft of the turbomachine with a motoring system.

17 Claims, 13 Drawing Sheets

(52) U.S. Cl.
CPC .... *F05D 2260/232* (2013.01); *F05D 2260/85* (2013.01); *F05D 2270/112* (2013.01); *F05D 2270/3032* (2013.01)

(58) Field of Classification Search
CPC ........... F05D 2260/85; F05D 2270/112; F05D 2270/3032; F02C 7/12; F02C 7/16; F02C 7/18; F02C 7/26; F02C 7/268
See application file for complete search history.

(56) References Cited

U.S. PATENT DOCUMENTS

| | | |
|---|---|---|
| 10,174,678 B2 | 1/2019 | Schwarz et al. |
| 10,443,505 B2 | 10/2019 | Virtue, Jr. et al. |
| 10,443,507 B2 | 10/2019 | Schwarz et al. |
| 10,508,567 B2 | 12/2019 | Stachowiak et al. |
| 10,508,601 B2 | 12/2019 | Sheridan et al. |
| 10,787,933 B2 | 9/2020 | Clauson et al. |
| 2008/0310949 A1 | 12/2008 | Kondo et al. |
| 2014/0373518 A1 | 12/2014 | Manneville et al. |
| 2014/0373552 A1 | 12/2014 | Zaccaria et al. |
| 2014/0373553 A1 | 12/2014 | Zaccaria et al. |
| 2017/0234231 A1 | 8/2017 | Virtue, Jr. et al. |
| 2017/0234238 A1* | 8/2017 | Schwarz ................. F01D 21/00 60/778 |
| 2017/0342855 A1 | 11/2017 | Hon et al. |
| 2018/0283197 A1* | 10/2018 | Jackowski ............. F01D 25/14 |
| 2019/0186359 A1 | 6/2019 | Stevenson |
| 2020/0165959 A1* | 5/2020 | Smith ................. F02N 11/0803 |
| 2020/0165976 A1 | 5/2020 | Brown et al. |
| 2020/0271011 A1* | 8/2020 | Comandore ............ F01D 19/02 |
| 2021/0003033 A1* | 1/2021 | Ellis ..................... F01D 25/145 |

\* cited by examiner

THERMAL BIAS CONTROL IN TURBOMACHINES

FIELD

The present disclosure generally pertains to managing residual heat within various regions of a turbomachine after a turbomachine has been shut down and/or prior to starting a turbomachine.

BACKGROUND

When a turbomachine is shut down after a period of operation, hot air within the turbomachine tends to rise, which may lead to uneven cooling within the turbomachine. As a result, for a period of time after a turbomachine has been shut down, various regions of the turbomachine may exhibit different amounts of thermal expansion, which is sometimes referred to as "rotor bow" or a "bowed rotor." For example, a rotor shaft of the turbomachine may exhibit more thermal expansion at an upward portion of the rotor shaft relative to a downward portion of the rotor shaft.

Over time, thermal expansion within the turbomachine may generally approach an equilibrium. However, if a start-up method for a turbomachine is initiated under a bowed rotor condition, the turbomachine may exhibit vibration or cause airfoil blades to approach contact with a surrounding casing.

Accordingly, it would be welcomed in the art to provide turbomachines with improved capabilities for managing residual heat, including improved engine control system, and improved methods of operating a turbomachine, such as on-ground cooling methods, engine shut-down methods, and engine start-up methods.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
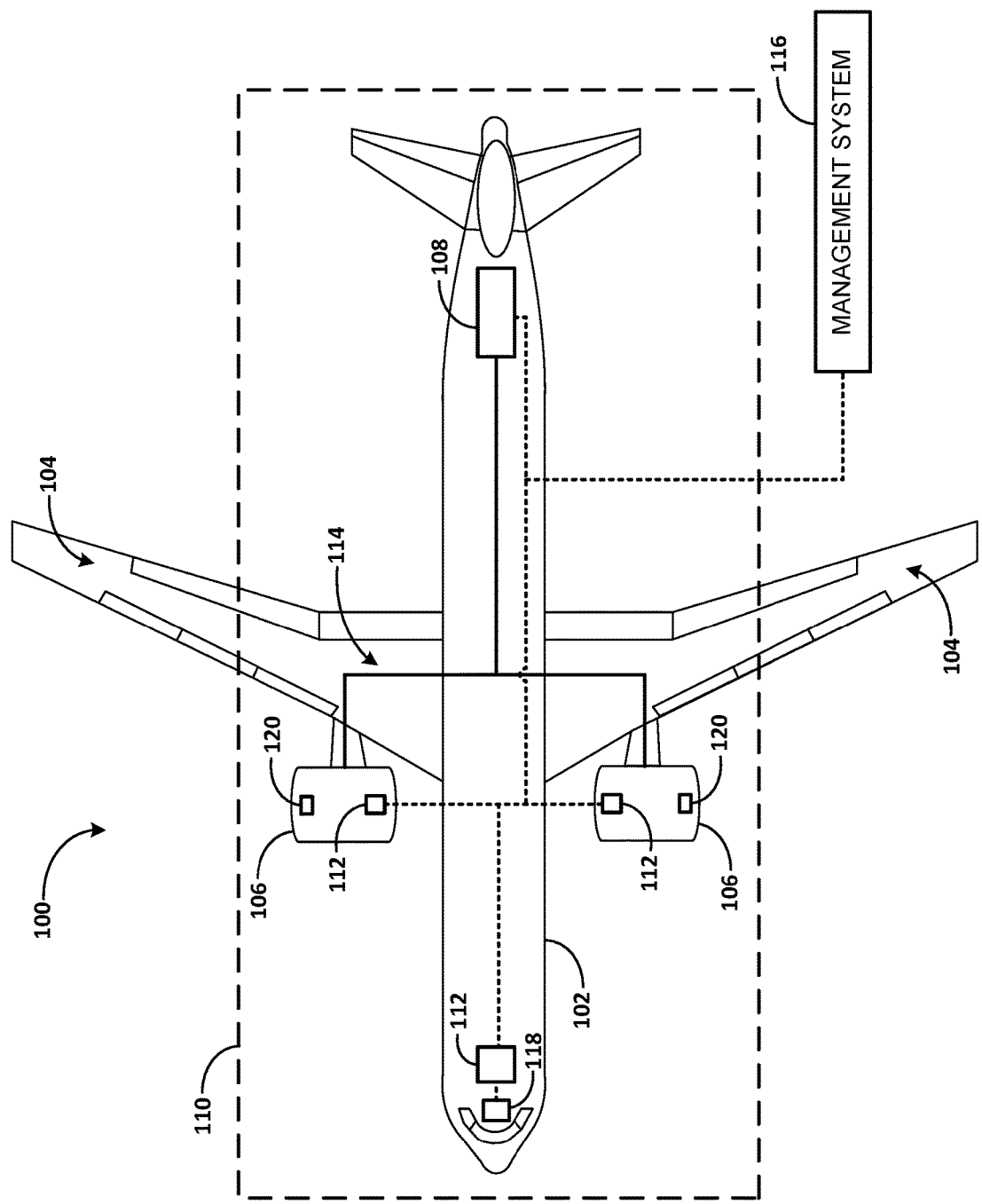
FIG. 1 schematically depicts an exemplary aircraft that includes one or more turbomachines.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally pertains to managing residual heat within various regions of a turbomachine after a turbomachine has been shut down and/or prior to starting a turbomachine. The residual heat may be managed based at least in part on a thermal bias between an upward portion of the turbomachine and a downward portion of the turbomachine. The thermal bias may be determined by one or more temperature sensors. In some embodiments, the turbomachine may be rotated so that temperature measurements may be determined for the upward portion and the downward portion of the turbomachine using the same one or more sensors. Additionally, or in the alternative, improved methods of controlling thermal bias may be provided. For example, improved control systems may provide cooling treatment based on thermal bias determined from temperature measurements from one or more temperature sensors configured to determine temperature measurements from any one or more locations around a circumferential perimeter of one or more regions of a turbomachine.

The thermal bias may be controlled based at least in part on a comparison of the thermal bias to an upper control limit and/or a lower control limit. Whether the thermal bias is compared to an upper control limit or a lower control limit may depend at least in part on an operating state for a cooling treatment. When the cooling treatment has an active operating state, an initial or current value for thermal bias may be compared to a lower control limit, and the cooling treatment may be deactivated when the initial value for thermal bias is less than the lower control limit. When the cooling treatment has an inactive operating state, an initial/current value or a projection value for thermal bias may be compared to an upper control limit, and the cooling treatment may be activated when the initial/current value or the projection value is greater than the upper control limit. In this way, the cooling treatment may be activated and deactivated one or more times, for example, as part of an on-ground cooling method, an engine shut-down method, and/or an engine start-up method. An engine shut-down method may include shutting down the turbomachine and performing a cooling treatment. An on-ground cooling method may include performing a cooling treatment when the turbomachine is in a non-started state. An engine start-up method may include performing a cooling treatment and starting the turbomachine.

By deactivating a cooling treatment when the initial/current thermal bias is less than a lower control limit, more efficient cooling treatments and/or a more efficient reduction in thermal bias may be realized while still providing good protection from bowed rotor conditions. Additionally, or in the alternative, by activating a cooling treatment when either an initial or current value, or a projection value, for thermal bias exceeds an upper control limit, good control of thermal bias may be provided when the thermal bias is sufficiently high or projected to sufficiently high. In some embodiments, a projection value for thermal bias may correspond to a defined time period from the current or initial time. The defined time period may be selected at least in part to allow the cooling treatment to be initiated a sufficient amount of time before the thermal bias exceeds the upper control limit. The thermal bias may cycle between the upper and lower control limits while the cooling treatment is activated and deactivated according to a cooling treatment model.

In some embodiments, the turbomachine may be started even when the thermal bias current value is above the lower control limit, such as even when the thermal bias-value is increasing, for example, during a time period prior to a time when a projection value for the thermal bias exceeds the upper control limit. In this way, the presently disclosed thermal bias control may provide a series of time periods when the turbomachine may be started even when the turbomachine has a sufficient level of residual heat that may lead to a thermal bias value that exceeds the upper control limit. As such, the presently disclosed methods of controlling thermal bias may provide increased flexibility in scheduling start-up times for turbomachines, for example, to accommodate schedule changes to a flight itinerary for an aircraft powered by one or more turbomachines that include engine control systems and motoring systems configured to control thermal bias in accordance with the present disclosure.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Exemplary embodiments of the present disclosure will now be described in further detail.

FIG. 1 schematically depicts an exemplary aircraft 100 that may incorporate various embodiments of the present disclosure. The aircraft 100 may include a fuselage 102 and a pair of wings 104 extending laterally outward from the fuselage 102. It will be appreciated that the embodiment shown is provided by way of example and not to be limiting, and that presently disclosed subject matter may be incorporated into other embodiments of an aircraft without departing from the scope of the present disclosure. As shown, the aircraft 100 may include one or more turbomachines 106 configured to provide thrust for operating the aircraft 100 such as during flight and/or taxiing. As shown, a first turbomachine 106 may be mounted to a first wing 104, such as in an under-wing configuration, and a second turbomachine 106 may be mounted to a second wing 104, such as in an under-wing configuration. In some embodiments, a plurality of turbomachines 106 may be mounted to the first and second wings 104, respectively. Additionally, or in the alternative, one or more turbomachines 106 may be mounted to the aircraft 100 in other suitable locations and/or configurations, such as to the fuselage 102 aft of the wings 104.

The aircraft 100 may include one or more auxiliary power units 108 configured to provide auxiliary power to the aircraft 100, such as when the aircraft 100 is on the ground and the one or more turbomachines 106 are not running. The one or more auxiliary power units 108 may be configured to provide energy for auxiliary systems of the aircraft 100. Additionally, or in the alternative, the one or more auxiliary power units 108 may be configured to provide energy to rotate one or more turbomachines 106, such as in connection with an on-ground cooling method and/or in connection with an engine shut-down or engine start-up method in accordance with the present disclosure. In various embodiments, an auxiliary power unit 108 may be configured to rotate the first and second turbomachines 106, or a first auxiliary power unit 108 may be configured to rotate the first turbomachine 106 and a second auxiliary power unit 108 may be configured to rotate the second turbomachine 106.

The aircraft 100 may include an engine control system 110 configured to control operations of the aircraft 100 and the various systems thereof, including, for example, operations of the one or more turbomachines 106 and/or operations of the one or more auxiliary power units 108. The engine control system 110 may include one or more computing devices 112. The one or more computing devices 112 may include one or more engine control units, electronic engine controllers, and/or full-authority digital engine control (FADEC) device. The one or more computing devices 112 may be located anywhere in the aircraft 100. By way of example, a first computing device 112, such as a FADEC device, may be located on or in close proximity to a first turbomachine 106, a second computing device 112 may be located on or in close proximity to a second turbomachine 106, and/or a third computing device may be located within the fuselage 102 of the aircraft 100, such as in the cockpit. The one or more computing devices 112 may be communicatively coupled to the one or more turbomachines 106, to the one or more auxiliary power units 108, and/or to one another, via a wired or wireless communications network 114. The engine control system 110 may also be communicatively coupled with a management system 116 and/or a user interface 118 via a wired or wireless communications network. The management system 116 and the engine control system 110 may be configured to interact with one another in connection with enterprise-level or fleet-level operations pertaining to the aircraft 100 and/or the engine control system 110. Such enterprise level operations may include transmitting data from the management system 116 to the engine control system 110 and/or transmitting data from the engine control system 110 to the management system 116. The user interface 118 may include one or more user input/output devices to allow a user to interact with the engine control system 110.

The aircraft 100 may include a plurality of sensors 120 for sensing various operating conditions associated with the aircraft 100. The plurality of sensors may be communicatively coupled with one or more of the computing devices 112 of the engine control system 110. The plurality of sensors 120 may include one or more airspeed sensors, temperature sensors, pressure sensors, sensors for recording ambient conditions, and the like. Sensor data from the respective sensors 120 may be provided to the one or more computing devices 112.

Figure 2A:
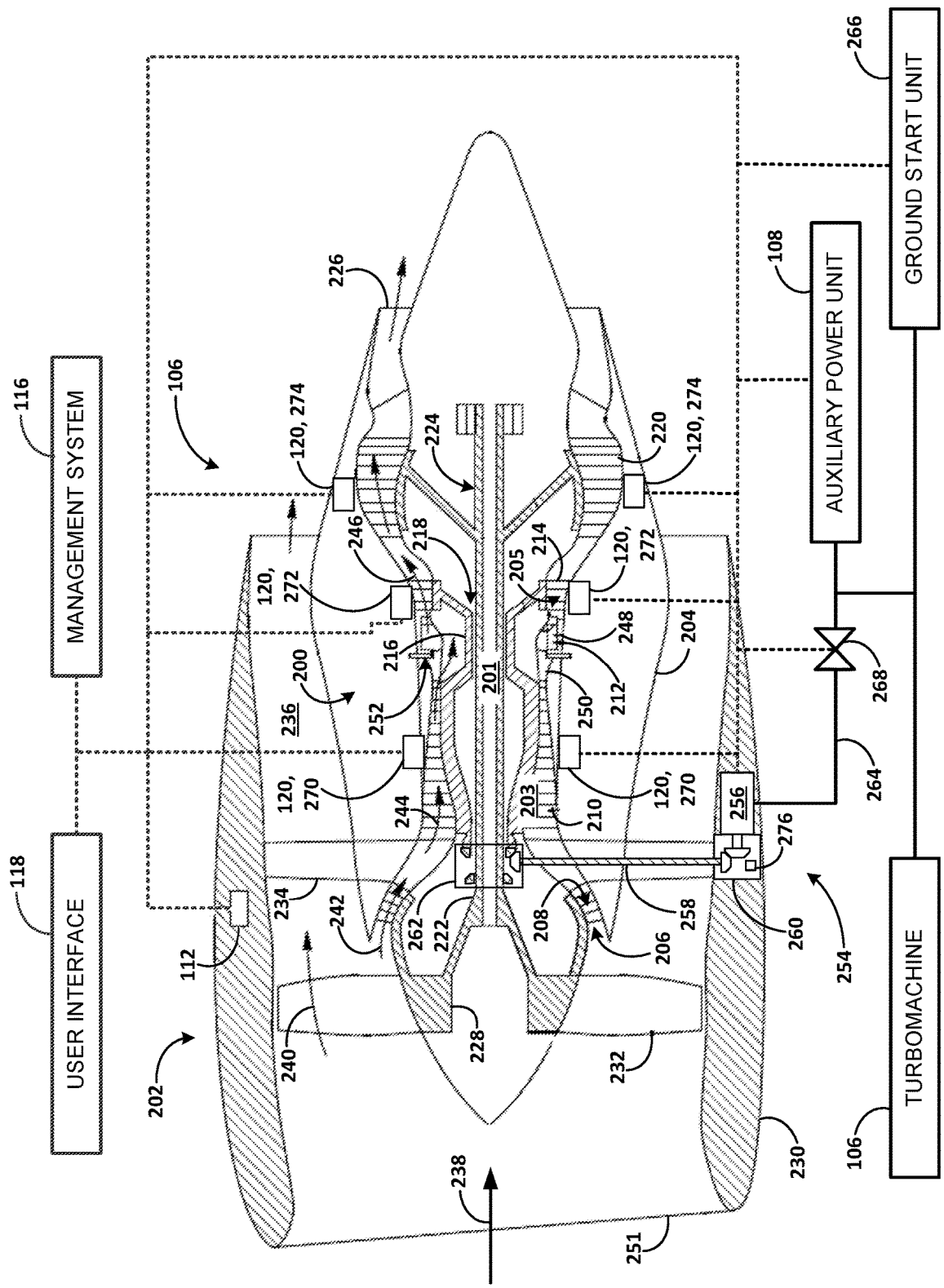
FIGS. 2A and 2B schematically depict exemplary embodiments of a turbomachine that includes a motoring system.
Figure 2B:
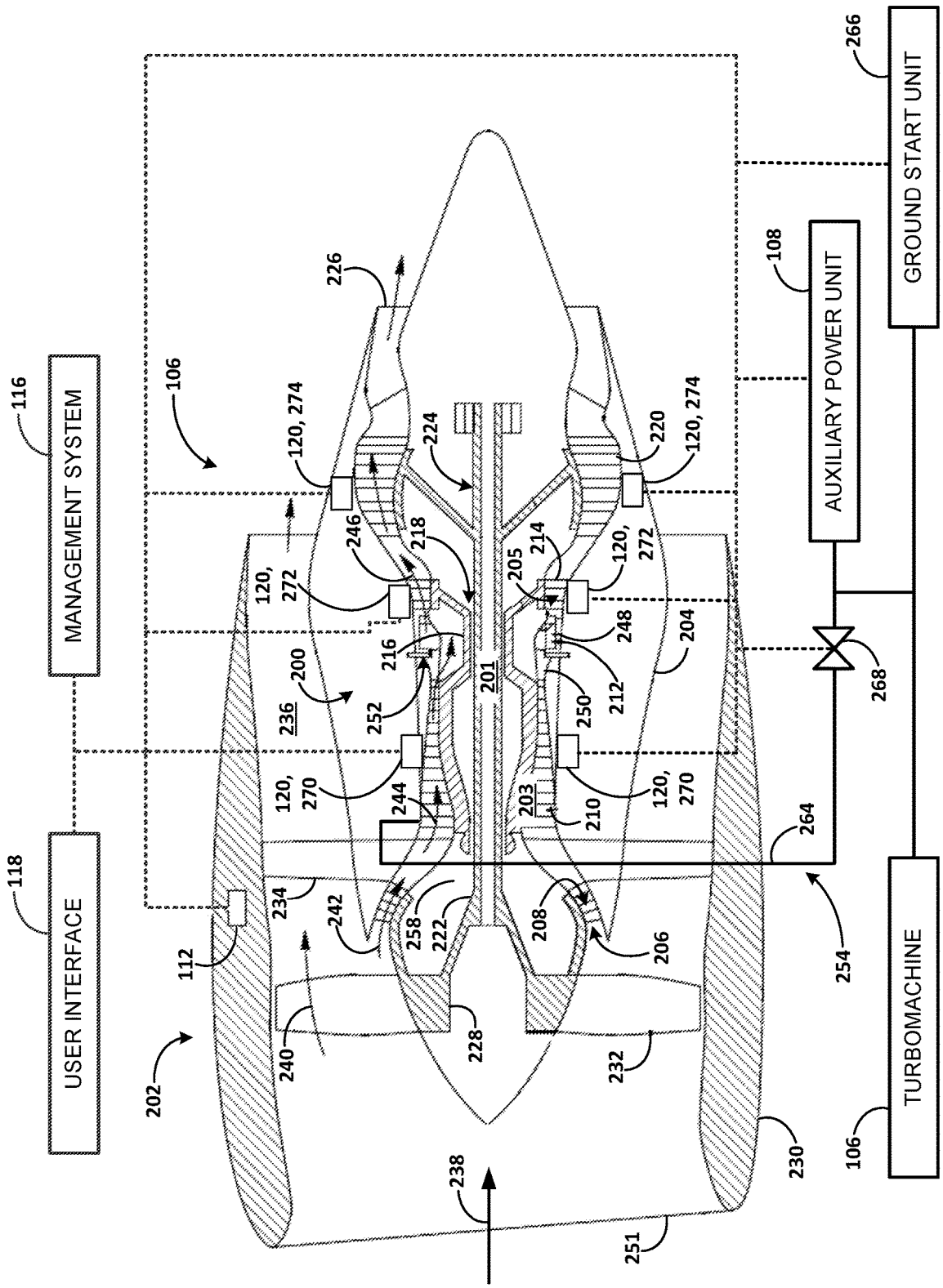

Referring to FIGS. 2A and 2B, an exemplary turbomachine 106 will be described. It will be appreciated that the turbomachine 106 shown in FIG. 2 is provided by way of example and not to be limiting, and that the subject matter of the present disclosure may be implemented with other suitable types of turbomachines, such as steam and other types of gas turbine engines. Further examples of turbomachines may include turbojets, turboprop, turboshaft, aeroderivatives, auxiliary power units, etc. As shown, the turbomachine 106 may include a core engine 200. The core engine 200 may include one or more shafts 201, with one or more compressor stages 203 and one or more turbine stages 205 coupled to the one or more shafts 201. The core engine 200 may also include a combustion chamber coupled to a respective one of the one or more shafts 201. For example, a first one or more compressor stages 203 and a first one or more turbine stages 205 may be coupled to a first one of the one or more shafts 201. A second one or more compressor stages 203 and a second one or more turbine stages 205 may be coupled to a second one of the one or more shafts 201. In some embodiments, a fan section 202 may be positioned upstream of the core engine 200.

In some embodiments, the core engine 200 may include an engine cowl 204 that defines an annular core inlet 206. The engine cowl 204 may enclose and/or support a booster or low pressure compressor 208. The low pressure compressor 208 may be configured to pressurize air that enters the core engine 200 through core inlet 206. The core engine 200 may include a high pressure compressor 210. The high pressure compressor 210 may include multiple stages arranged axially relative to one another. The high pressure compressor 210 may receive pressurized air from the low pressure compressor 208 and further increases the pressure of the air flowing therethrough. The pressurized air may flow from the high pressure compressor 210 to a combustor 212 where fuel is injected into the pressurized air stream and ignited to raise the temperature and energy level of the pressurized air. High energy combustion gasses in the combustor 212 flow from the combustor 212 to a high pressure turbine 214. The high pressure turbine 214 and the high pressure compressor 210 may be coupled to a high pressure shaft ("HP shaft") 216. The high pressure turbine 214 may drive a rotating portion of the high pressure compressor 210 by way of the HP shaft 216. The HP shaft 216, a rotating portion of the high pressure compressor 210 coupled to the HP shaft 216, and a rotating portion of the high pressure turbine 214 coupled to the HP shaft 216, may be collectively referred to as a high speed or high pressure spool 218.

The high energy combustion gasses exiting the high pressure turbine 214 flow to a low pressure turbine 220. The low pressure turbine 220 and the low pressure compressor 208 may be coupled to a low pressure shaft ("LP shaft") 222. The low pressure turbine 220 may drive a rotating portion of the low pressure compressor 208 by way of the LP shaft 222. The LP shaft 222 may be coaxial with the HP shaft 216. The LP shaft 222 and the HP shaft 216 may freely rotate relative to one another. The LP shaft 222, a rotating portion of the low pressure compressor 208 coupled to the LP shaft 222, a rotating portion of the low pressure turbine 220 coupled to the LP shaft 222, and a rotating portion of the fan section 202, may be collectively referred to as a low speed or low pressure spool 224. Combustion gasses exiting the low pressure turbine 220 may flow through an exhaust nozzle 226 to produce propulsive thrust.

The fan section 202 may include a rotatable, axial-flow fan rotor 228 surrounded by an annular fan casing 230. The fan rotor 228 includes a plurality of fan blades 232 extending outward from the fan rotor 228. The fan casing 230 is supported by the core engine 200 by a plurality of substantially radially-extending, circumferentially-spaced outlet guide vanes 234. The fan casing 230 encloses the fan rotor 228 and the plurality of fan blades 232 extending outward from the fan rotor 228. A downstream section of the fan casing 230 extends over an outer portion of the core engine 200 to define a bypass passage 236. Air that passes through the bypass passage 236 provides propulsive thrust.

During operation of the turbomachine 106, an initial or inlet airflow 238 enters the turbomachine 106 through an inlet 251 defined by the fan casing 230. The airflow 238 passes through the fan blades 232 and splits into a first air flow 240 that moves through the bypass passage 236 and a second air flow 242 that enters the low pressure compressor 208 through the core inlet 206. The pressure of the second airflow 242 is progressively increased by the low pressure compressor 208 and then enters the high pressure compressor 210, as represented by arrow 244. The discharged pressurized air stream flows downstream to the combustor 212 where fuel is introduced to generate combustion gasses, as represented by arrow 246. The combustion gasses exit the combustor 212 and flow through the high pressure turbine 214. The combustion gasses then flow through the low pressure turbine 220 and exit the exhaust nozzle 226 to produce thrust. Concurrently, a portion of the inlet airflow 238 flows through the bypass passage 236 and through an exit nozzle defined between the fan casing 230 and the engine cowl 204 at the downstream section of the fan casing 230, producing further propulsive thrust.

As further shown in FIGS. 2A and 2B, the combustor 212 defines an annular combustion chamber 248 that is generally coaxial with a longitudinal axis. The combustor 212 receives an annular stream of pressurized air from a high pressure compressor discharge outlet 250. A portion of this compressor discharge air flows into a mixer (not shown). Fuel is injected by a fuel nozzle 252 of a fuel delivery system to mix with the air. This forms a fuel-air mixture that is provided to the combustion chamber 248 for combustion. Ignition of the fuel-air mixture is accomplished by an igniter, and the resulting combustion gasses flow in an axial direction toward and into the high pressure turbine 214. The high pressure turbine 214 rotates the HP shaft 216, thereby driving the high pressure compressor 210. The combustion gasses exit the high pressure turbine 214 and flow into the low pressure turbine 220 via the HP shaft 216. The low pressure turbine 220 rotates the LP shaft 222, thereby drives the low pressure compressor 208 and the fan rotor 228 via the LP shaft 222.

Still referring to FIGS. 2A and 2B, exemplary motoring systems 254 for a turbomachine 106 will be described. A motoring system 254 may be utilized to rotate HP shaft 216 and/or the LP shaft 222 of the turbomachine 106 in connection with an on-ground cooling method and/or in connection with an engine shut-down or engine start-up method in accordance with the present disclosure. As shown in FIG. 2A, a motoring system 254 may include a motor 256 configured to rotate the HP shaft 216 and/or the LP shaft 222 of the turbomachine 106. The motor 256 may be drivingly coupled to the HP shaft 216 and/or the LP shaft 222 of the turbomachine 106, such as by way of a radial drive shaft 258. For example, the motoring system 254 may include an external gearbox 260 and/or an internal gearbox 262. The external gearbox 260 may be drivingly coupled to the internal gearbox 262 by way of a radial drive shaft 258. The external gearbox 260 may be configured to engage with the motor 256 to rotate the radial drive shaft 258, for example, by way of a series of gears, clutches, or the like. The motor 256 may be configured as an air turbine motor, an electric motor, or the like. In some embodiments, the motor 256 may be configured as a starter motor, such as an air-turbine starter, an electric starter, or the like. The internal gearbox 262 may be configured to rotate the HP shaft 216 and/or the LP shaft 222. As shown, the internal gearbox 262 may include a series of gears, clutches, or the like configured to drivingly engage the radial drive shaft 258 with the HP shaft 216. Additionally, or in the alternative, the internal gearbox 262 may include a series of gears, clutches, or the like configured to drivingly engage the radial drive shaft 258 with the LP shaft 222. The external gearbox 260 may sometimes be referred to as an accessory gearbox, as the external gearbox 260 may include a series of power takeoffs for operating various accessories to the turbomachine 106, such as a fuel pump, an oil pump, an electrical generator, a tachometer, and so forth.

When the motor 256 rotates the radial drive shaft 258 by way of the external gearbox 260, the radial drive shaft 258 may, in turn, rotate the HP shaft 216 by way of the internal gearbox 262. Rotation of the HP shaft 216 may cause the high pressure spool 218 to rotate, thereby causing air to circulate within and/or flow through the respective portions of the high pressure spool 218, from the high pressure compressor 210 to the combustion chamber 248, and/or from the combustion chamber to the high pressure turbine 214. Air from the high pressure turbine 214 may flow through the low pressure turbine, causing the LP shaft 222 to rotate. Rotation of the LP shaft 222 may cause the low pressure spool 224 to rotate, including, for example, the low pressure compressor 208 and or the fan rotor 228.

In some embodiments, such as when the motor 256 is configured as an air turbine motor, the motor 256 may receive motoring air from a motoring air supply line 264. The motoring air supply line 264 may be configured to supply motoring air to rotate the motor 256. The motoring air supply line 264 may be in fluid communication with an auxiliary power unit 108. Additionally, or in the alternative, the motoring air supply line 264 may be in fluid communication with a ground start unit 266, with another turbomachine 106 on the aircraft 100, and/or any other suitable source of motoring air. A motoring air supply valve 268 may be opened, closed, and/or modulated to control a flow of motoring air to the motor 256, thereby controlling the power output of the motor 256. In some embodiments, the rate of rotation of the high pressure spool 218 and/or the rate of rotation of the low pressure spool 224 may depend at least in part on the power output of the motor 256.

As shown in FIG. 2B, in some embodiments, the motoring system 254 may include a motoring air supply line 264 configured to supply motoring air to one or more regions of the turbomachine 106, such as one or more regions of the core engine 200 of the turbomachine 106. The motoring air supplied to the one or more regions of the core engine 200 may circulate within and/or flow through the respective regions of the core engine 200. Motoring air supplied to the one or more regions of the core engine 200 may cause the high pressure spool 218 and/or the low pressure spool 224 to rotate. As shown in FIG. 2B, the motoring air supply line 264 may be configured to supply motoring air to the high pressure compressor 210 of the turbomachine 106. Additionally, or in the alternative, the motoring air supply line 264 may be configured to supply motoring air to the low pressure compressor 208, the high pressure turbine 214, and/or the low pressure turbine 220. By way of example, when the motoring air causes the high pressure spool 218 to rotate, such rotation of the high pressure spool 218 may cause additional air to circulate within and/or flow through the respective portions of the high pressure spool 218, from the high pressure compressor 210 to the combustion chamber 248, and/or from the combustion chamber to the high pressure turbine 214. Air from the high pressure turbine 214 may flow through the low pressure turbine, causing the LP shaft 222 to rotate. Rotation of the LP shaft 222 may cause the low pressure spool 224 to rotate, including, for example, the low pressure compressor 208 and or the fan rotor 228. The motoring air may be supplied to the core engine 200 by any suitable source, such as an auxiliary power unit 108, a ground start unit 266, and/or any other suitable air source. The motoring air supply valve 268 may be opened, closed, and/or modulated to control a flow of motoring air to the core engine 200, thereby controlling the rate of rotation of the high pressure spool 218 and/or the rate of rotation of the low pressure spool 224.

Additionally, or in the alternative, in some embodiments, a motoring air supply line 264 may be configured to supply motoring air to the fan section 202 of the turbomachine. Motoring air supplied to the fan section 202 of the turbomachine 106 may cause the fan rotor 228 to rotate, thereby rotating the low pressure spool 224. Rotation of the low pressure spool 224 may cause air to flow through the high pressure spool 218, thereby rotating the high pressure spool 218.

Still referring to FIGS. 2A and 2B, the turbomachine 106 may include one or more sensors 120, such as one or more high pressure compressor-sensors 270, one or more high pressure turbine-sensors 272, and/or one or more low pressure turbine-sensors 274. The one or more sensors may respectively include a temperature sensor and/or a pressure sensor. For example, the one or more high pressure compressor-sensors 270 may include one or more temperature sensors configured to obtain temperature measurements from the high pressure compressor 210 and/or from the core engine 200 adjacent to the high pressure compressor 210. The one or more high pressure turbine-sensors 272 may include one or more temperature sensors configured to obtain temperature measurements from the high pressure turbine 214 and/or from the core engine 200 adjacent to the high pressure turbine 214. The one or more low pressure turbine-sensors 274 may include one or more temperature sensors 120 configured to obtain temperature measurements from the low pressure turbine 220 and/or from the core engine 200 adjacent to the low pressure turbine 220.

The one or more sensors 120 may be respectively located at any desired axial position within the turbomachine 106, including at a position corresponding to a respective stage or stages of the high pressure compressor 210, the high pressure turbine 214, and/or the low pressure turbine 220. The one or more sensors 120 may be respectively configured to determine sensor measurements, such as temperature measurements and/or pressure measurements, at any desired circumferential position of a shaft 201 of the turbomachine 106, such as any desired circumferential position of the HP shaft 216 and/or the high pressure spool 218, and/or any desired position of the LP shaft 222 and/or the low pressure spool 224. A circumferential position of a shaft 201 of the turbomachine 106 may be described with reference to a 360-degree circumferential axis and/or with reference to time positions on a clock. A vertical axis may intersect the circumferential axis at 0-radians, or ($2\pi$)-radians, or twelve o'clock at the top of the circumferential axis, and at ($\pi$)-radians, or six o'clock at the bottom of the circumferential axis. For example, one or more of the sensors 120 may be configured to determine sensor measurements corresponding to an upward position of the turbomachine 106, such as an upward position of the high pressure spool 218 and/or an upward position of the low pressure spool 224. The upward position of the turbomachine 106 may include 0-radians on the circumferential axis of the turbomachine 106. For example, the upward position may include a location within a range of from about ($\pi/3$)-radians to about ($5\pi/3$)-radians, such as from about ($\pi/6$)-radians to about ($11\pi/6$)-radians, such as from about ($2\pi$)-radians+/−($\pi/3$)-radians, such as from about ($2\pi$)-radians+/−($\pi/6$)-radians, or such as from about ($2\pi$)-radians+/−($\pi/18$)-radians. Additionally, or in the alternative, one or more of the sensors 120 may be configured to determine sensor measurements corresponding to a downward position of the turbomachine 106, such as an upward position of the high pressure spool 218 and/or an upward position of the low pressure spool 224. The downward position of the turbomachine 106 may include ($\pi$)-radians on the circumferential axis of the turbomachine 106. For example, the downward position may include a location within a range of from about ($2\pi/3$)-radians to about ($4\pi/3$)-radians, such as from about ($5\pi/6$)-radians to about ($7\pi/6$)-radians, such as from about ($\pi$)-radians+/−($\pi/3$)-radians, such as from about ($\pi$)-radians+/−($\pi/6$)-radians, or such as from about ($\pi$)-radians+/−($\pi/18$)-radians. Additionally, or in the alternative, one or more of the sensors 120 may be configured to determine sensor measurements corresponding to a side position of the turbomachine 106. The side position of the turbomachine 106 may include ($3\pi/2$)-radians on the circumferential axis of the turbomachine 106. For example, the side position may include a location within a range of from about ($\pi/6$)-radians to about ($5\pi/6$)-radians, such as from about ($\pi/3$)-radians to about ($2\pi/3$)-radians, or such as from about ($\pi/2$)-radians+/−($\pi/18$)-radians. Additionally, or in the alternative, the side position may include a location within a range of from about ($7\pi/6$)-radians to about ($11\pi/6$)-radians, such as from about ($4\pi/3$)-radians to about ($5\pi/3$)-radians, or such as from about ($3\pi/2$)-radians+/−($\pi/18$)-radians. A turbomachine 106 may include one or more sensors 120 located about the circumferential axis of the turbomachine 106, for example, with a circumferential separation of from about ($\pi/36$)-radians to about ($\pi$)-radians, such as from about ($\pi/36$)-radians to about ($\pi/6$)-radians, such as from about ($\pi/6$)-radians to about ($\pi/3$)-radians, such as from about ($\pi/3$)-radians to about ($\pi/2$)-radians, or such as from about ($\pi/2$)-radians to about ($\pi$)-radians.

Figure 3A:
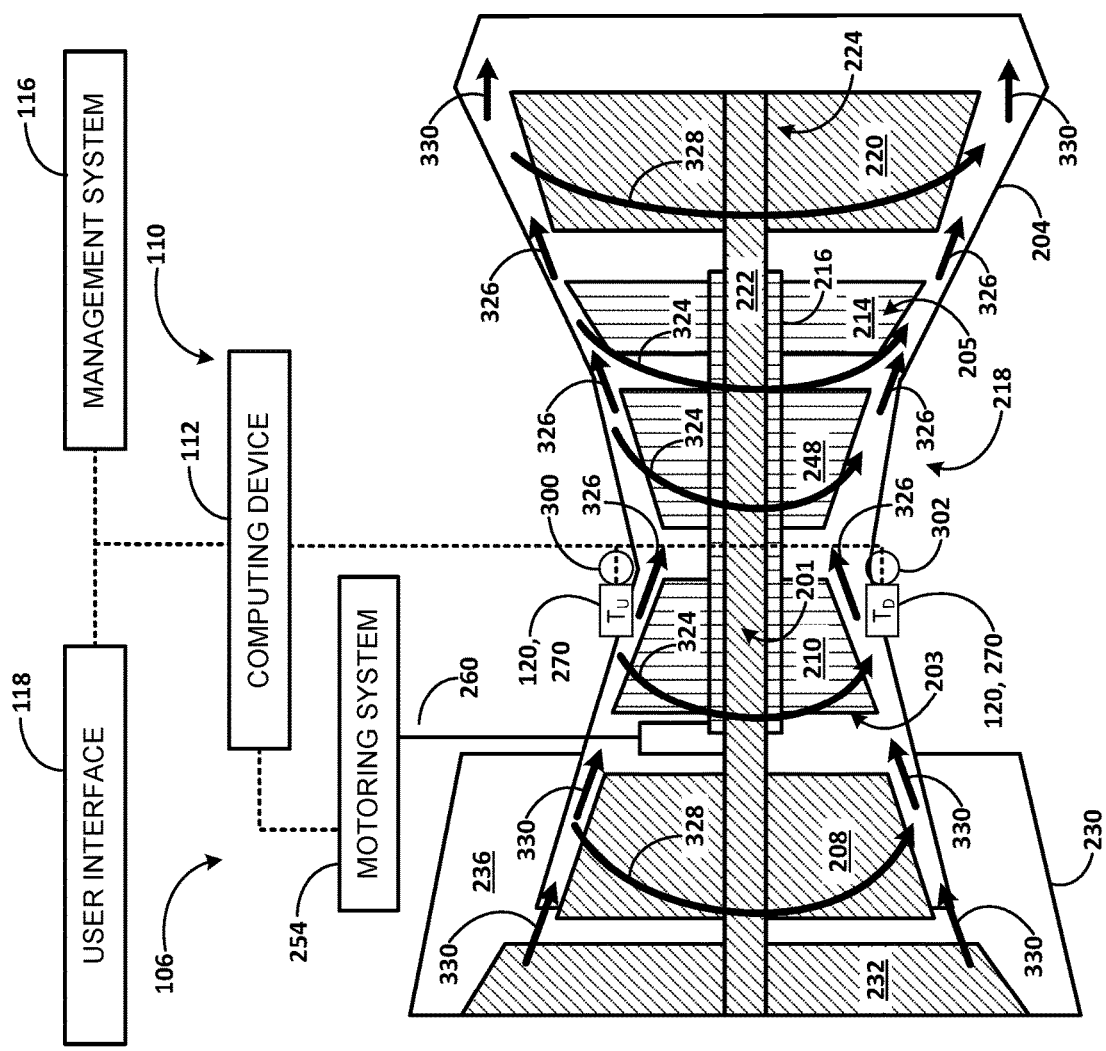
FIGS. 3A and 3B schematically depict exemplary sensors and systems for temperature sensor measurements that may be determined from one or more sensors of a turbomachine.
Figure 3B:
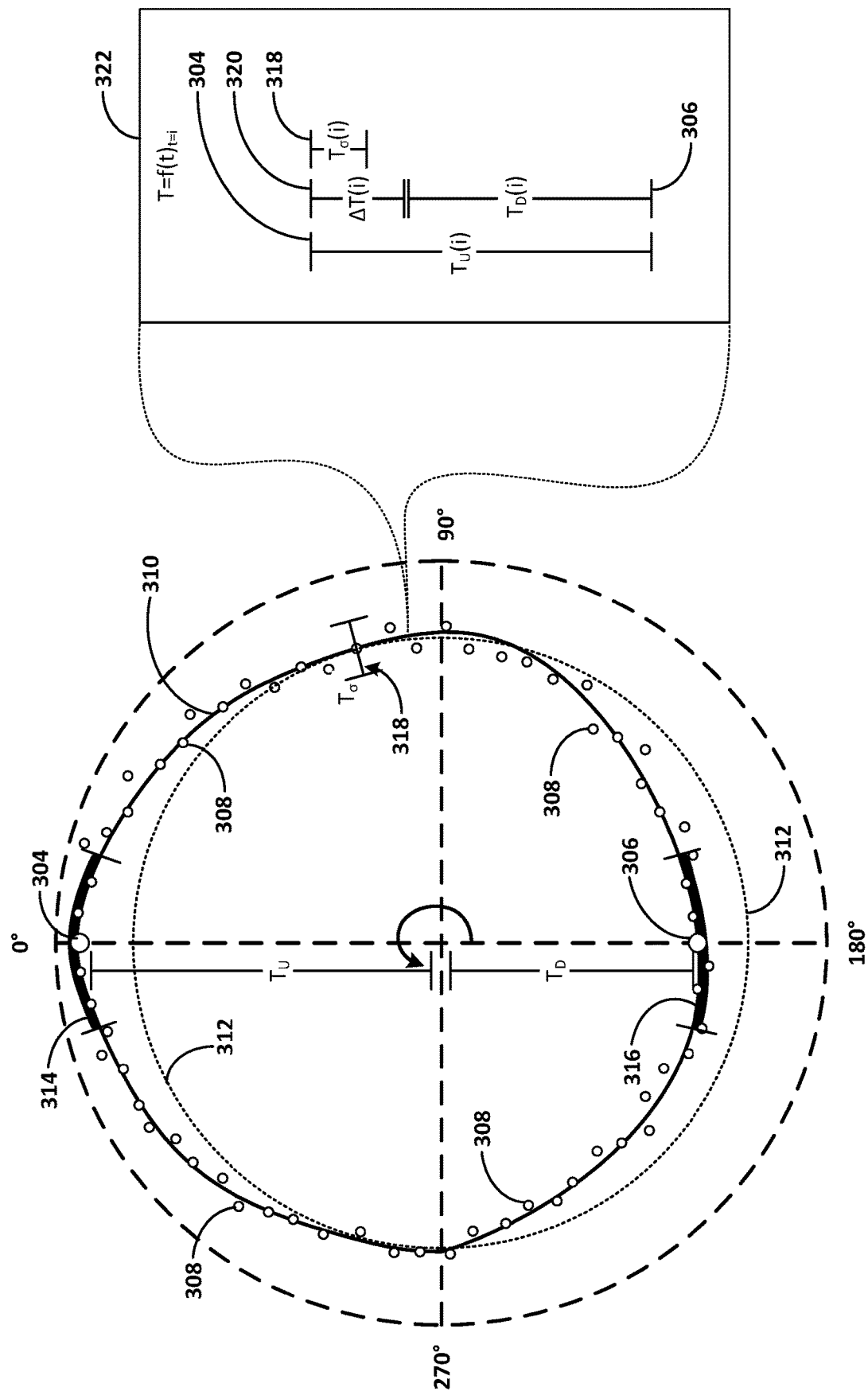

Referring now to FIGS. 3A and 3B, exemplary sensor measurements that may be utilized in connection with thermal bias control will be described. The sensor measurements may be determined from the one or more sensors 120. The one or more sensors 120 may be communicatively coupled to a computing device 112, such as may be included in an electronic engine controller, a full-authority digital engine control (FADEC) device, or the like. The computing device 112 may be configured to determine sensor values, such as a temperature or pressure, from the sensor measurements obtained from the one or more sensors 120. The computing device 112 may be configured to cause the motoring system 254 to perform an on-ground cooling method, an engine shut-down method, and/or an engine start-up method, based at least in part on an input from the one or more sensors 120. As shown in FIG. 3A, a turbomachine 106 may include one or more sensors 120 configured to obtain temperature measurements from one or more locations of the turbomachine 106. For example, one or more high pressure compressor-sensors 270 may be configured as a temperature sensor 120, such as a thermocouple, a thermopile, an RTD (resistance temperature detector), a thermistor, or the like.

In some embodiments, the one or more sensors 120, such as one or more high pressure compressor-sensor 368, may include an upward temperature sensor 300 and/or a downward temperature sensor 302. The upward temperature sensor 300 may be located at an upward portion of the core engine 200 and/or otherwise configured to obtain temperature measurements at an upward portion of the turbomachine 106, such as at an upward portion of the core engine 200. The downward temperature sensor 302 may be configured to obtain temperature measurements at a downward portion of the turbomachine 106, such as at a downward portion of the core engine 200. One or more upward temperature sensors 300 and/or one or more downward temperature sensors 302 may be distributed axially along the core engine 200. As shown, the upward temperature sensor 300 and/or the downward temperature sensor 302 may be configured to obtain temperature measurements at a location of the core engine 200 corresponding to the high pressure compressor 210. For example, the upward temperature sensor 300 and/or the downward temperature sensor 302 may include a probe extending into the core engine 200 adjacent to the high pressure compressor 210. Additionally, or in the alternative, the upward temperature sensor 300 and/or the downward temperature sensor 302 include a probe extending into the high pressure compressor 210, such as through a stator vane of the high pressure compressor 210. Additionally, or in the alternative, the turbomachine 106 may include one or more upward temperature sensors 300 and/or the downward temperature sensor 302 with a probe extending into at least one of the core engine 200 adjacent to the low pressure compressor 208 or into the low pressure compressor 208 (e.g., through a stator vane of the low pressure compressor 208), adjacent to the combustion chamber 248 or into the combustion chamber 248, adjacent to the high pressure turbine 214 or into the high pressure turbine 214 (e.g., through a stator vane of the high pressure turbine 214), or adjacent to the low pressure turbine 220 or into the low pressure turbine 220 (e.g., through a stator vane of the low pressure turbine 220).

As shown in FIG. 3B, a computing device 112 may be configured to determine one or more upward temperature-values 304 and/or one or more downward temperature-values 306. The one or more upward temperature-values may correspond to a first one or more temperature measurements 308 of an upward portion of the turbomachine 106. The upward portion of the turbomachine 106 may include any suitable location about the circumferential axis of the turbomachine 106. The downward portion of the turbomachine 106 may include any suitable location about the circumferential axis of the turbomachine that is below the upward portion of the turbomachine 106. Additionally, or in the alternative, the upward portion of the turbomachine 106 may include any suitable location about the circumferential axis of the turbomachine 106 that is above the downward portion of the turbomachine 106. For example, the upward portion of the turbomachine 106 may include a location above a horizontal midline of the turbomachine 106. In some embodiments, the upward portion of the turbomachine 106 may include an intersection of the vertical axis and the top of the circumferential axis of the turbomachine 106. Additionally, or in the alternative, the downward portion of the turbomachine 106 may include a location below a horizontal midline of the turbomachine 106. In some embodiments, the downward portion of the turbomachine 106 may include an intersection of the vertical axis and the bottom of the circumferential axis of the turbomachine 106.

In some embodiments, the upward temperature-values 304 may be determined from temperature measurements 308 obtained from an upward temperature sensor 300, and/or the downward temperature-values 306 may be determined from temperature measurements 308 obtained from a downward temperature sensor 302. Additionally, or in the alternative, in some embodiments, the upward temperature-values 304 and the downward temperature-values 306 may be determined from temperature measurements 308 obtained from the same sensor 120. For example, temperature measurements 308 obtained from an upward temperature sensor 300 may be used to determine both the upward temperature-values 304 and the downward temperature-values 306 by rotating the high pressure spool 218 and/or the low pressure spool 224 using the motoring system 254 and obtaining temperature measurements 308 at different points of rotation. As another example, temperature measurements 308 obtained from a downward temperature sensor 302 may be used to determine the both upward temperature-values 304 and the downward temperature-values 306 by rotating the high pressure spool 218 and/or the low pressure spool 224 using the motoring system 254 at different points of rotation. For example, an upward temperature-value 304 may be determined from one or more temperature measurements 308 obtained with a shaft 201 of the turbomachine 106 oriented at (0)-radians of rotation, and/or a downward temperature-value may be determined from one or more temperature measurements 308 obtained with the shaft 201 of the turbomachine 106 oriented at ($\pi$)-radians of rotation. The orientation of a shaft 201 of the turbomachine 106 with respect to the circumferential axis may include an orientation of the HP shaft 216 and/or the high pressure spool 218, and/or an orientation of the LP shaft 222 and/or the low pressure spool 224. An upward temperature-value 304 may be determined from an upward temperature sensor 300 at the initiation of a spool rotation sequence that includes rotating the high pressure spool 218 and/or the low pressure spool 224. A downward temperature-value 306 may be determined from an upward temperature sensor 300 during a spool rotation sequence that includes rotating the high pressure spool 218 and/or the low pressure spool 224 by about ($\pi$)-radians, for example, such that a downward portion of the high pressure spool 218 and/or a downward portion of the low pressure spool 224 becomes adjacent to the upward temperature sensor 300. Additionally, or in the alternative, a downward temperature-value 306 may be determined from a downward temperature sensor 302 at the initiation of a spool rotation sequence that includes rotating the high pressure spool 218 and/or the low pressure spool 224. An upward temperature-value 304 may be determined from a downward temperature sensor 302 during a spool rotation sequence that includes rotating the high pressure spool 218 and/or the low pressure spool 224 by about ($\pi$)-radians, for example, such that an upward portion of the high pressure spool 218 and/or an upward portion of the low pressure spool 224 becomes adjacent to the downward temperature sensor 302.

In still further embodiments, an upward temperature-value 304 and/or a downward temperature-value 306 may be determined from a sensors 120 located at any desired position about a circumference of a turbomachine 106, such as from a side position or from any desired circumferential position of the core engine 200, in addition or in the alternative to an upward position or a downward position. In some embodiments, temperature measurements 308 from a sensor 120 may be utilized to determine an upward temperature-value 304 and/or a downward temperature-value 306 regardless of the circumferential location of a sensor 120. For example, an upward temperature-value 304 and/or a downward temperature-value 306 may be determined from a sensors 120 located at a side position, by coordinating the radians of rotation to the circumferential location of the sensor 120. By way of illustration, for a sensor 120 located at about ($\pi/2$)-radians, an upward temperature-value 304 may be determined from the sensor 120 using temperature measurements 308 obtained upon having rotated the high pressure spool 218 and/or the low pressure spool 224 such that an upward portion thereof becomes adjacent to the side position corresponding to the sensor 120. In some embodiments, the temperature measurements 308 from a sensor 120 at the side position of the core engine 200 utilized to determine the upward temperature-value 304 may correspond to the high pressure spool 218 and/or the low pressure spool 224 having been rotated about ($\pi/2$)-radians, thereby aligning the upward portion of the high pressure spool 218 and/or the low pressure spool 224 with the sensor 120. Additionally, or in the alternative, the temperature measurements 308 from the sensor 120 at the side position utilized to determine the downward temperature-value 306 may correspond to the high pressure spool 218 and/or the low pressure spool 224 having been rotated about ($3\pi/2$)-radians, thereby aligning the downward portion of the high pressure spool 218 and/or the low pressure spool 224 with the sensor 120.

Still referring to FIG. 3B, in some embodiments, a plurality of temperature measurements 308 may be determined about a circumference of one or more locations of the core engine 200, and/or about a circumference of one of more locations of the high pressure spool 218 and/or the low pressure spool 224. In some embodiments, a circumferential temperature profile 310 for one or more locations of the high pressure spool 218 and/or the low pressure spool 224 may be determined from the plurality of temperature measurements 308. The temperature profile may be determined from a regression or best fit of the temperature measurements 308. The temperature measurements 308 may be obtained periodically or continuously over a period of time. Additionally, or in the alternative, the temperature profile may be determined periodically or continuously or over a period of time.

The upward temperature-value 304 and/or the downward temperature-value 306 may be determined from a plurality of temperature measurements 308, such as from a plurality of temperature measurements 308 determined about a circumference of one or more locations of the core engine 200, and/or about a circumference of one of more locations of the high pressure spool 218 and/or the low pressure spool 224. In some embodiments, the upward temperature-value 304 and/or the downward temperature-value 306 may be determined by synchronizing the rotational position of the high pressure spool 218 and/or the low pressure spool 224 with the temperature measurements 308, such as by a tachometer 276 coupled to the turbomachine 106 and/or the motoring system 254. Additionally, or in the alternative, temperature measurements 308 that represent relatively higher values may be attributed to an upward portion of respective region of the turbomachine 106 and/or temperature measurements 308 that represent relatively lower values may be attributed to a downward portion of the respective region of the turbomachine 106. By obtaining a plurality of temperature measurements 308 in coordination with rotating the high pressure spool 218 and/or the low pressure spool 224, an upward portion of the high pressure spool 218 and/or the low pressure spool 224 may be determined, for example, based on a difference in temperature at various circumferential locations thereof. In some embodiments, the temperature measurements 308 and/or the difference in temperature at various circumferential locations of the high pressure spool 218 and/or the low pressure spool 224 may be utilized to determine the upward temperature-value 304 and/or the downward temperature-value 306, for example, without reference to a circumferential position prior to commencing rotation. For example, a circumferential position that has a relatively higher temperature may correspond to an upward portion of the high pressure spool 218 and/or the low pressure spool 224. Additionally, or in the alternative, a circumferential position that has a relatively lower temperature may correspond to a downward portion of the high pressure spool 218 and/or the low pressure spool 224. In this way, the upward portion and the downward portion of the high pressure spool 218 and the low pressure spool 224 can be determined even when the high pressure spool 218 and the low pressure spool 224 rotate independently from one another and/or at different rates of rotation.

The upward temperature-value 304 may be determined from or more temperature measurements 308 corresponding to relatively higher values. For example, a plurality of temperature measurements 308 that represent a relatively higher temperature across an arc of the circumferential temperature profile 310 may be utilized to determine the upward temperature-value 304. The temperature measurements 308 that represent a relatively higher temperature may be determined, for example, with reference to a circumferential temperature profile 310 and/or an average circumferential temperature 312. At least some of the plurality of temperature measurements 308 representing a relatively higher temperature may define an upward temperature arc 314. The upward temperature arc 314 may include a group or cluster of temperature measurements 308 that have a relatively higher temperature, for example, relative to the average circumferential temperature 312. The upward temperature-value 304 may be determined based at least in part on one or more temperature measurements 308 from the upward temperature arc 314. For example, the upward temperature-value 304 may correspond to a maximum temperature, an average temperature value, or the like, from the upward temperature arc 314.

The downward temperature-value 306 may be determined from or more temperature measurements 308 corresponding to relatively lower values. For example, a plurality of temperature measurements 308 that represent a relatively lower temperature across an arc of the circumferential temperature profile 310 may be utilized to determine the downward temperature-value 306. The temperature measurements 308 that represent a relatively lower temperature may be determined, for example, with reference to the circumferential temperature profile 310 and/or the average circumferential temperature 312. At least some of the plurality of temperature measurements 308 representing a relatively lower temperature may define a downward temperature arc 316. The downward temperature arc 316 may include a group or cluster of temperature measurements 308 that represent a relatively lower temperature, for example, relative to the average circumferential temperature 312. The downward temperature-value 306 may be determined based at least in part on one or more temperature measurements 308 from the downward temperature arc 316. For example, the downward temperature-value 306 may correspond to a maximum temperature, an average temperature value, or the like, from the downward temperature arc 316.

In some embodiments, the arc length of the upward temperature arc 314 and/or the downward temperature arc 316 may be determined based at least in part on a degree of variability of the temperature measurements 308 corresponding to the circumferential temperature profile 310. For example, the arc length of the upward temperature arc 314, and/or the arc length of the downward temperature arc 316, may include a range of temperature measurements 308 that correspond a variance (To (i)) 318 in the temperature measurements 308, such as a statistical variance, a specified variance, a standard deviation, a confidence interval, a control limit, or the like. The arc length of the upward temperature arc 314, and/or the arc length of the downward temperature arc 316, may extend to include a group of temperature measurements 308 that fall within a variance 318. The upward temperature arc 314 may include a group of relatively higher temperature measurements 308, for example, including and/or clustered around a maximum temperature value. The upward temperature arc 314 may include, for example, all temperature measurements 308 that fit within the variance 318 relative to a maximum temperature value, and/or a group of temperature measurements 308 that fit within a confidence interval relative to a maximum temperature value. The downward temperature arc 316 may include a group of relatively lower temperature measurements 308, for example, including and/or clustered around a minimum temperature. The downward temperature arc 316 may include, for example, all temperature measurements 308 that fit within the variance 318 relative to a minimum temperature value, and/or a group of temperature measurements 308 that fit within a confidence interval relative to a minimum temperature value. Such maximum temperature value may include an absolute maximum, an average maximum, or the like. Additionally, or in the alternative, such minimum temperature value may include an absolute minimum, an average minimum, or the like. Such maximum or minimum temperature value may be determined from a filtered data set. For example, a data set may be filtered to remove outliers and the like. The upward temperature arc 314 and/or the downward temperature arc 316 may extend a sufficient length to include temperature measurements 308 that fall within a variance 318, such as an arc length sufficient to include temperature measurements 308 that fit within a confidence interval. For example, the upward temperature arc 314 and/or the downward temperature arc 316 may have an arc length that includes temperature measurements 308 within the variance 318 to a 90%, 95%, or 99% confidence interval.

A thermal bias ($\Delta T$) 320 may be determined based at least in part on a difference between one or more temperature measurements 308. As shown in FIG. 3B, a thermal bias 320 may be determined based at least in part on a difference between an upward temperature-value 304 and a downward temperature-value 306. The thermal bias 320 may correspond to a difference in temperature as between an upward portion of the turbomachine 106 and a downward portion of the turbomachine 106. Additionally, or in the alternative, a thermal bias 320 may correspond to a difference in temperature as between at least two portions of the turbomachine 106, such as between portions of a turbomachine 106 located at about opposite circumferential positions, such as at circumferential positions separated by about ($\pi$)-radians, or such as by about ($\pi$)-radians+/−($\pi$/18)-radians. A thermal bias 320 may correspond to a difference in temperature as between a temperature value within an upward temperature arc 314, such as an upward temperature-value 304, and a temperature value within a downward temperature arc 316, such as a downward temperature-value 306. For example, in some embodiments, a thermal bias 320 may be determined as between a maximum temperature value within an upward temperature arc 314 and a minimum temperature value within a downward temperature arc 316. In some embodiments, the maximum temperature value within an upward temperature arc 314 may be determined to be the upward temperature-value 304 and/or a minimum temperature value within a downward temperature arc 316 may be determined to be the downward temperature-value 306.

Still referring to FIG. 3B, a thermal data set 322 may be determined for one or more time periods (i). The thermal data set 322 may be utilized to provide a cooling treatment to reduce and/or control thermal bias, such as in connection with an on-ground cooling method and/or in connection with an engine shut-down or engine start-up method, for example, to determine when to operate motoring system 254 for purposes of controlling thermal bias 320, such as within a range defined by upper and lower control limits. By way of example, the thermal data set 322 may include, for respective time periods, a plurality of temperature measurements 308, one or more upward temperature-values 304 and/or one or more downward temperature-values 306, a circumferential temperature profile 310, average circumferential temperature 312, an upward temperature arc 314, a downward temperature arc 316, a variance 318, a thermal bias 320, and/or one or more statistical values related thereto, such as a statistical variance, a standard deviation, a confidence interval, a control limit, or the like.

Referring again to FIG. 3A, in an exemplary embodiment, a cooling treatment may include rotating a shaft 201 of the turbomachine 106, such as the HP shaft 216 and/or the LP shaft 222, with the motoring system 254 for a period of time to sufficiently reduce the thermal bias 320. Rotation of the shaft 201, such as the HP shaft 216, for example, by the radial drive shaft 258 of the motoring system 254, may cause the high pressure spool 218 to rotate, thereby causing air to circulate within and/or flow through at least a portion of the high pressure spool 218. Air in the respective portions of the high pressure spool 218 may flow circumferentially and/or axially, depending, for example, on the rotational speed of the shaft 201, such as the HP shaft 216, and/or the pressure differential across respective portions of the high pressure spool 218 generated by rotation of the shaft 201 and/or air flow through the high pressure spool 218. At a relatively low rotational speed, air may flow circumferentially through one or more of the respective portions of the high pressure spool 218, for example, with minimal axial flow. Circumferential airflow through the high pressure spool 218 is represented by arrows 324. With sufficient rotational speed, air may flow axially through one or more of the respective portions of the high pressure spool 218. Such axial airflow through the high pressure spool 218 is represented by arrows 326. Additionally, or in the alternative, at a relatively low rotational speed, air may flow circumferentially through one or more of the respective portions of the low pressure spool 224, for example, with minimal axial flow. Circumferential airflow through the low pressure spool 224 is represented by arrows 328. With sufficient rotational speed, air may flow axially through one or more of the respective portions of the low pressure spool 224. Such axial airflow through the low pressure spool 224 is represented by arrows 330.

For embodiments in which the LP shaft 222 is not coupled to a radial drive shaft 258 of the motoring system 254, rotation of the high pressure spool 218, such as by way of a radial drive shaft 258 coupled to the HP shaft 216, and/or sufficient pressure differential across one or more portions of the high pressure spool 218, may generate sufficient airflow through at least a portion of the low pressure spool 224 to cause the low pressure spool 224 to rotate. Additionally, or in the alternative, the motoring system 254 may include a radial drive shaft 258 coupled to the LP shaft 222 and configured to rotate the low pressure spool 224. For embodiments in which the HP shaft 216 is not coupled to a radial drive shaft 258 of the motoring system 254, rotation of the low pressure spool 224, such as by waw of a radial drive shaft 258 coupled to the LP shaft 222, and/or sufficient pressure differential across one or more portions of the low pressure spool 224, may generate sufficient airflow through at least a portion of the high pressure spool 218 to cause the high pressure spool 218 to rotate. The HP spool 216 and/or the LP spool 224 may be rotated by the motoring system 254, for example, to control a thermal bias 320 (FIG. 3B) in connection with an on-ground cooling method, an engine shut-down method, and/or an engine start-up method. The rotation of the HP spool 216 and/or the LP spool 224 may be determined based at least in part on a thermal bias 320 and/or one or more other parameters of a thermal data set 322 (FIG. 3B).

Figure 4:
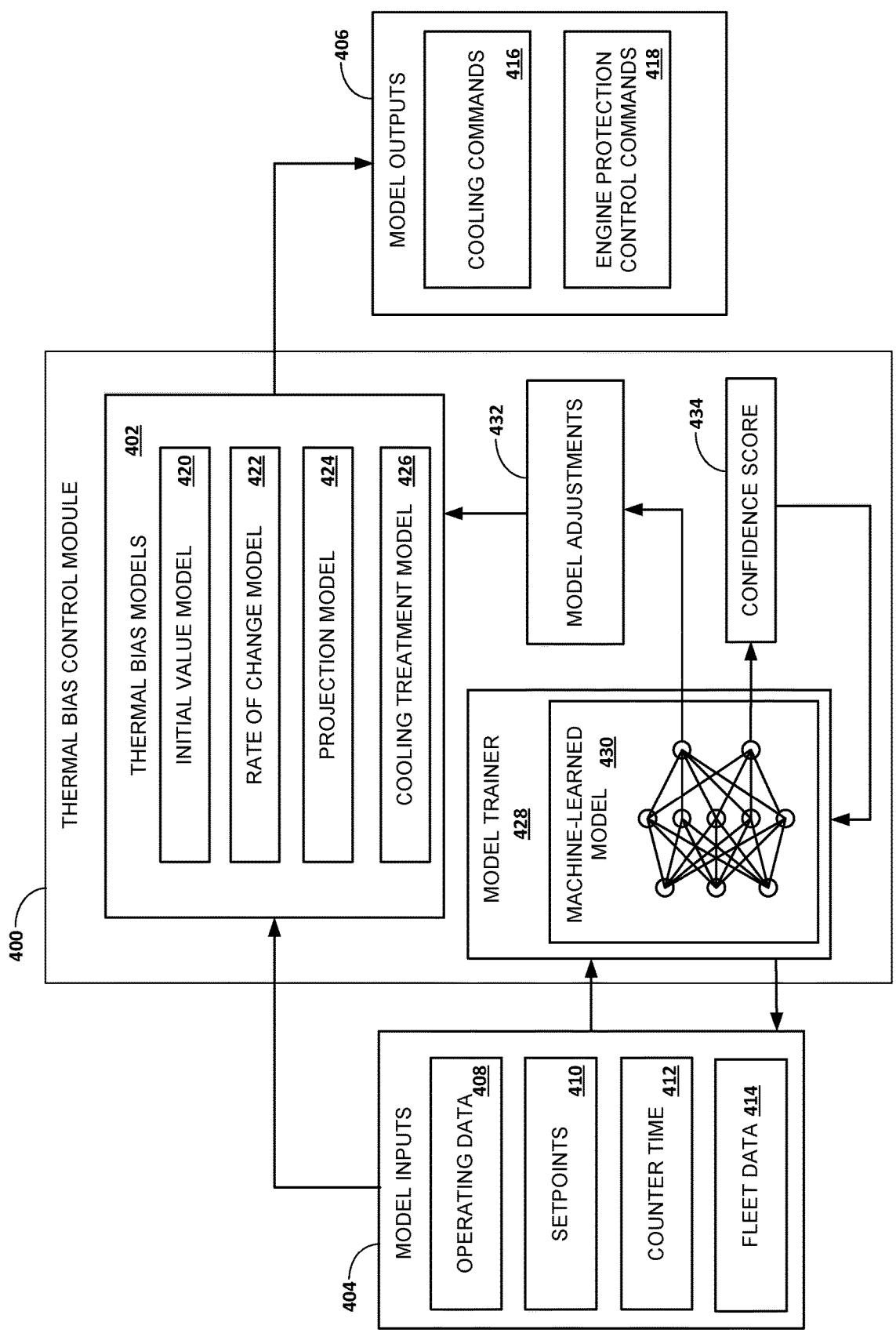
FIG. 4 schematically depicts an exemplary thermal bias control module.

Referring now to FIG. 4, an exemplary thermal bias control module 400 will be described. Thermal bias control module 400 may include one or more thermal bias models 402 configured to reduce and/or control thermal bias. The thermal bias control module 400 may be configured to reduce and/or control thermal bias when the turbomachine 106 is in a non-started state, such as only when the turbomachine 106 is in a non-started state. For example, the thermal bias control module 400 may be configured to control thermal bias 320 in connection with an on-ground cooling method, an engine shut-down method, and/or an engine start-up method. The thermal bias control module 400 may be implemented on one or more computing devices 112, such as one or more engine control units, electronic engine controllers, full-authority digital engine control (FADEC) devices, or the like. The thermal bias control module 400 may control thermal bias 320 at least in part by providing control commands to various controllable components of a turbomachine 106 and/or to various controllable components related to the turbomachine 106, such as controllable components of a motoring system 254, an auxiliary power unit 108, a ground start unit 266, or the like.

As shown in FIG. 4, the thermal bias control module 400 may receive one or more model inputs model inputs 404. The model inputs 404 may be utilized by one or more thermal bias models 402, for example, to provide one or more model outputs 406. The model inputs 404 may include sensor data 408, such as temperature measurements 308 from one or more sensors 120 configured to obtain temperature measurements 308 from one or more locations of the turbomachine 106. The sensor data 408 may additionally include data from various other sources associated with the turbomachine 106, a motoring system 254, an auxiliary power unit 108, a ground start unit 266, and so forth. The model inputs 404 may additionally include one or more setpoints 410, such as setpoints 410 for upper and/or lower control limits corresponding to operations of the one or more thermal bias models and/or setpoints 410 corresponding to the one or more model outputs 406. The model inputs 404 may additionally include a counter time 412, such as a clock time, to which various actions of the thermal bias models 402 may be synchronized. Additionally, or in the alternative, one or more model outputs 406 may be synchronized to the counter time 412. In some embodiments, the model inputs 404 may include fleet data 414, such as data from a management system 116. The fleet data 414 may include past operating data pertaining to an aircraft 100 and/or turbomachine 106 utilizing the thermal bias control module 400. Additionally, or in the alternative, the fleet data 414 may include current or past operating data from other aircraft 100 and/or other turbomachines 106, such as current or past operating data pertaining to thermal bias control module 400 implemented with such other aircraft 100 and/or such other turbomachines 106.

The thermal bias control module 400 may include one or more model outputs 406. The model outputs may include control commands to one or more controllable components of a turbomachine 106 and/or to one or more controllable components related to the turbomachine 106, such as one or more controllable components of a motoring system 254, an auxiliary power unit 108, and/or a ground start unit 266. In some embodiments, the model outputs 406 may include cooling control commands 416. A cooling control command 416 may be configured to control one or more controllable components in connection with rotating one or more portions of the turbomachine 106, such as a HP spool 216 and/or an LP spool 224, for example, in connection with an on-ground cooling method, an engine shut-down method, and/or an engine start-up method. Additionally, or in the alternative, the model outputs 406 may include one or more engine protection control commands 418. An engine protection control command 418 may be configured to protect a turbomachine 106 from damage or unnecessary wear, for example, by enabling or disabling operation of one or more controllable components. For example, an engine protection control command 418 may be configured to activate or deactivate operation of one or more controllable components of the turbomachine 106 and/or one or more controllable components related to the turbomachine 106, such as one or more controllable components of a motoring system 254, an auxiliary power unit 108, and/or a ground start unit 266. For example, an engine protection control command 418 may disable an engine start-up method or a portion thereof in the event of a thermal bias 320 that may damage or cause unnecessary wear to the turbomachine 106 if the turbomachine 106 were operated prior to sufficiently reducing thermal bias. Additionally, or in the alternative, an engine protection control command 418 may disable an engine start-up method or a portion thereof during an on-ground cooling method. As another example, an engine protection control command 418 may disable an on-ground cooling method or a portion thereof prior to or during an engine start-up method for starting a turbomachine 106.

The thermal bias control module 400 may include one or more thermal bias models 402. In some embodiments, a thermal bias model 402 may include an initial value model 420. An initial value model 420 may be configured to determine an initial value for a thermal bias 320. An initial value for a thermal bias 320 may be described by the relationship: $\Delta T(i)=T_U(i)-T_D(i)$, where for an initial time, (i), $\Delta T(i)$ is the thermal bias 320, $T_U(i)$ is an upward temperature-value 304, and $T_D(i)$ is a downward temperature-value 306. The initial time, (i), may be any selected initial time, such as a current time, an engine shut-off time, or any other selected time. Additionally, or in the alternative, an initial value for a thermal bias 320 may be described by the relationship: $\Delta T(i)=f(m\_{initial})\ [T_U(i)-T_D(i)]$, where $f(m\_{initial})$ is a machine-learned function pertaining to the thermal bias 320 for the initial time. The machine-learned function may include a static factor, such as a multiplier. Additionally, or in the alternative, the machine-learned function may include one or more variables and/or one or more single-order or multiple-order functions.

In addition, or in the alternative to an initial value model 420, a thermal bias model 402 may include a rate of change model 422. A rate of change model 422 may be configured to determine a rate of change for a thermal bias 320. A rate of change for a thermal bias 320 may be described by the relationship: $dT(i)/dt=[\Delta T(i)-\Delta T(i-1)]/\delta t$, where $dT(i)/dt$ is the rate of change for the thermal bias 320, and $\delta t$ is a time period. Additionally, or in the alternative, a rate of change for a thermal bias 320 may be described by the relationship: $\Delta T(i)=f(m\_{rate})\ [\Delta T(i)-\Delta T(i-1)]/\delta t$, where $f(m\_{rate})$ is a machine-learned function pertaining to the thermal bias 320 and/or the rate of change for the thermal bias 320. The machine-learned function may include a static factor, such as a multiplier. Additionally, or in the alternative, the machine-learned function may include one or more variables and/or one or more single-order or multiple-order functions.

In addition, or in the alternative to an initial value model 420 and/or a rate of change model 422, a thermal bias model 402 may include a projection model 424. A projection model 424 may be configured to determine a projection value for a thermal bias 320 at a future time. A projection value for a thermal bias 320 may be described by the relationship: $\Delta T(i+t_{SET})=\Delta T(i)+(t_{SET} \cdot dT(i)/dt)$, where $\Delta T(i+t_{SET})$ is the projection value for the thermal bias 320, and $t_{SET}$ is the time period from the initial time, (i) for which the projection value for a thermal bias 320 is determined. In addition, or in the alternative to the foregoing, a thermal bias model 402 may utilize numerous other operating data, such as inputs from other sensors associated with a turbomachine, operating conditions and/or operating duration prior to shut-down, and the like. Additionally, or in the alternative, a projection value for a thermal bias 320 may be described by the relationship: $\Delta T(i)=f(m\_{projection})\ [\Delta T(i)+(t_{SET} \cdot dT(i)/dt)]$, where $f(m\_{projection})$ is a machine-learned function pertaining to the thermal bias 320 and/or the projection value for a thermal bias 320. The machine-learned function may include a static factor, such as a multiplier. Additionally, or in the alternative, the machine-learned function may include one or more variables and/or one or more single-order or multiple-order functions.

A thermal bias model 402 may additionally, or alternatively include one or more cooling treatment models 426. A cooling treatment model 426 may be configured to determine one or more control parameters. Such control parameters may be utilized by the cooling treatment model 426, for example, to provide model outputs 406 such as control commands. Exemplary control parameters may include setpoints, gain values, filters, feedback parameters, cascade hierarchies, transfer functions, differential equations, and so forth. Such control parameters may be based at least in part on operating data 408 and/or fleet data 414. Additionally, or in the alternative, a cooling treatment model 426 may be configured to determine a control regime, such as a control loop. Exemplary control regimes may include on-off control, linear control, proportional control, proportional-integral-derivative (PID) control, single-input-single-output (SISO) control, multi-input-multi-output (MIMO) control, multi-input-single-output (MISO) control, H2-optimal control, H-infinity control, Mu-synthesis control, distributed parameter control, hierarchical control, model predictive control, and so forth. Such a control regime may utilize the one or more control parameters determined by the cooling treatment model 426. Additionally, or in the alternative, a cooling treatment model 426 may be configured to determine one or more control commands, such as cooling control commands 416 and/or engine protection control commands 418. The control commands determined by the cooling treatment model 426 may be determined based at least in part on one or more control parameters and/or based at least in part on a control regime determined by the cooling treatment model 426. Additionally, or in the alternative, the cooling treatment model 426 may be configured to determine one or more control parameters, control regimes, and/or control commands, based at least in part on data from an additional thermal bias model 402, such as data from an initial value model 420, a rate of change model 422, and/or a projection model 424. The control commands determined by the cooling treatment model 426 may be utilized to control one or more controllable components of a turbomachine 106, a motoring system 254, an auxiliary power unit 108, and/or a ground start unit 266. By way of example, the control commands may be utilized in an on-ground cooling method, an engine shut-down method, and/or an engine start-up method.

In some embodiments, the model outputs 406 may include cooling control commands 416. A cooling command 416 may be configured to control one or more controllable components in connection with a cooling treatment, such as rotating one or more portions of the turbomachine 106, such as a HP spool 216 and/or an LP spool 224. Such cooling treatments may be performed, for example, in connection with an on-ground cooling method, an engine shut-down method, and/or an engine start-up method. Additionally, or in the alternative, the model outputs 406 may include one or more engine protection control commands 418.

As shown in FIG. 4, in some embodiments, thermal bias control module 400 may include a model trainer 428. The model trainer 428 may use training data, such as a representative data set, to train, adjust, and/or develop a thermal bias model 402. The training data may include model inputs 404, such as operating data 408 accumulated concurrently with operation of existing thermal bias models 402 and/or from previous operations of a thermal bias model 402. Additionally, or in the alternative, the training data may include model inputs 404, such as fleet data 414, from previous operations of other aircraft 100 or other turbomachines 106. Any one or more various training or learning techniques may be utilized by the model trainer 428, such as backwards propagation of errors, including, for example, performing truncated backpropagation through time. In some embodiments, supervised training techniques may be used on a set of labeled training data. The model trainer 428 may perform a number of generalization techniques (e.g., weight decays, dropouts, etc.) to improve the generalization capability of the thermal bias models 402 being trained.

An exemplary model trainer 428 may include a machine-learned model 430. The model trainer 428 may utilize one or more model inputs 404 as inputs to a machine-learned model 430. The model trainer 428 may output one or more model adjustments 432. The model adjustments 432 may include updates or adjustments to one or more thermal bias models 402, such as to settings, values, and/or schedules included in or utilized by such a thermal bias model 402. Additionally, or in the alternative, the model adjustments 432 may include new thermal bias models 402, and/or new settings, values, and/or schedules to be included in or utilized by one or more thermal bias model 402. The machine-learned model 430 may provide a machine-learned function, f(m). Such a machine-learned function may be utilized by or included in a thermal bias model 402. For example, the machine-learned model 430 may include a machine-learned function pertaining to the thermal bias 320, a rate of change for the thermal bias 320, and/or a projection value for a thermal bias 320. In some embodiments, the machine-learned model 430 may include and/or may be based at least in part on one or more thermal data sets 322, such as a plurality of thermal data sets 322 accumulated over the course of one or more on-ground cooling method and/or in connection with an engine shut-down or engine start-up method. The thermal data sets 322 utilized by the machine-learned model 430 may be determined by a computing device 112 associated with an aircraft 100 or turbomachine 106 that receives control commands from the thermal bias control module 400, such as by the computing device that executes the thermal bias control module 400. Additionally, or in the alternative, the thermal data sets 322 utilized by the machine-learned model 430 may be provided by a management system 116. In some embodiments, the thermal data sets 322 utilized by the machine-learned model 430 may include thermal data sets 322 determined from previous operations of the aircraft 100 or turbomachine 106 that receives control commands from the thermal bias control module 400, and/or from previous operations of other aircraft 100 or other turbomachines 106. The machine-learned model 430 may be configured to determine one or more model outputs 406 to be provided by a thermal bias model 402, and/or one or more criterion, algorithm, or formula based upon which one or more model outputs 406 may be provided. The machine-learned model 430 may provide an improved criterion, algorithm, or formula for determining a thermal bias 320. For example, the machine-learned model 430 may provide an improved initial value model 420, an improved rate of change model 422, and/or an improved projection value model 424. Additionally, or in the alternative, the machine-learned model 430 may provide an improved on-ground cooling method, engine shut-down method, or engine start-up method, for example, to provide improved control of such thermal bias 320.

A machine-learned model 430 may use any suitable machine learning technique, operating regime, or algorithm. A machine-learned model 430 may be configured to use pattern recognition, computational learning, artificial intelligence, or the like to derive algorithms that allow the machine-learned model 430 to determine model adjustments 432 to one or more thermal bias models 402, new thermal bias models 402, and/or new settings, values, and/or schedules to be included in or utilized by a thermal bias model 402. A machine-learned model 430 may include an unsupervised or a supervised learning regime, including a semi-supervised learning regime, an active learning regime, a reinforcement learning regime, and/or a representation learning regime. A machine-learned model 430 may utilize neural networks, decision trees, association rules, inductive logic algorithms, cluster analysis algorithms, and the like. In some embodiments, the model inputs 404 utilized by a thermal bias model 402 may include data associated with or generated by a machine-learned model 430.

In some embodiments, as illustrated in FIG. 4, the machine-learned model 430 may include a neural network. Additionally, or in the alternative, an exemplary machine-learned model 430 may include any other suitable model, including a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, and combinations thereof. Further types of machine or statistical learning models are also contemplated. It will also be appreciated that the machine-learned model 430 can use certain mathematical methods alone or in combination with one or more other machine or statistical learning models.

In addition to outputting a model adjustments 432, in some embodiments, a machine-learned model 430 may output a confidence score 434. The confidence score 434 may provide an indication as to a level of confidence attributable to one or more outputs of the machine-learned model 430. Additionally, or in the alternative, a thermal bias model 402 may output a confidence score 434 that provides an indication as to a level of confidence attribute one or more model outputs 406 of the thermal bias model 402. The confidence score 434 can be used, for example, to set a margin of error to be used by the thermal bias control module 400 in determining a model adjustments 432. For example, in the event of a low confidence score 434 the thermal bias control module 400 may account for a more conservative or wide margin for error when determining a model adjustments 432, whereas in the event of a high confidence score 434 the thermal bias control module 400 may allow for a more aggressive or narrow margin for error when determining a model adjustments 432. In some embodiments, the model inputs 404 may include a confidence score 434.

Figure 5A:
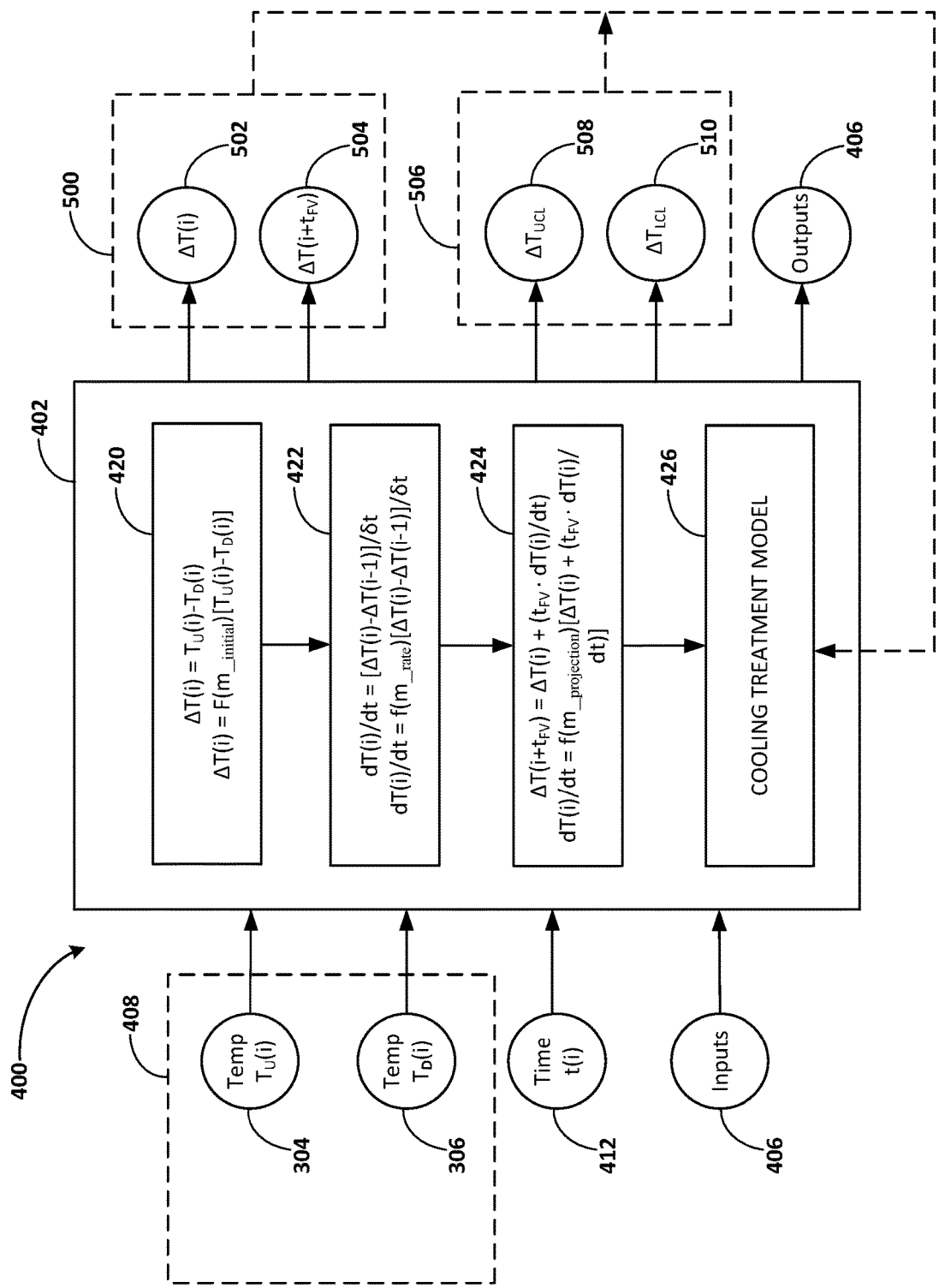
FIGS. 5A and 5B schematically depict exemplary thermal bias models that may be included in a thermal bias control module.
Figure 5B:
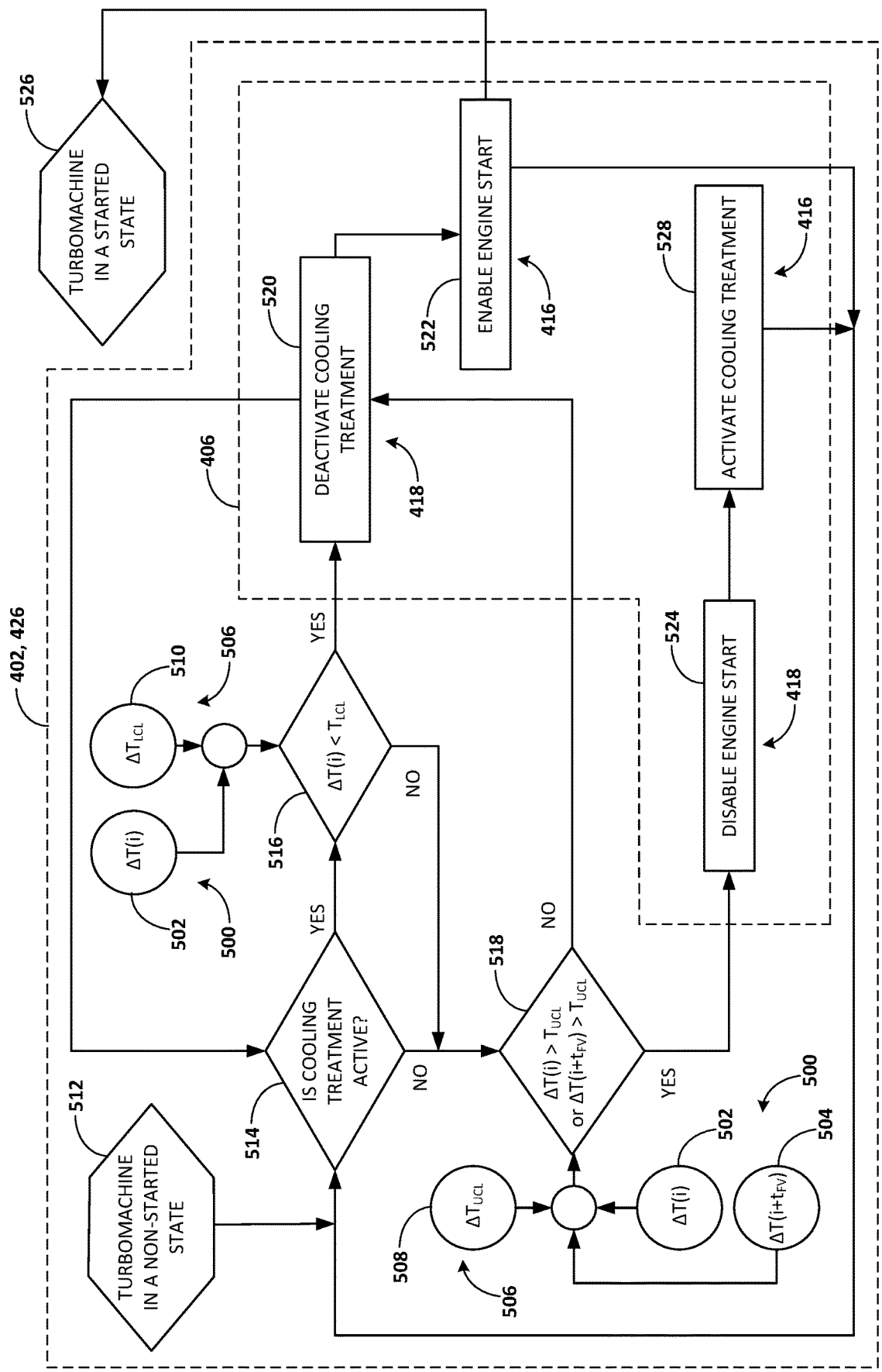

Referring now to FIGS. 5A and 5B, exemplary thermal bias models 402, such as exemplary cooling treatment models 426, are further described. A thermal bias model 402 may be configured to provide cooling treatments to reduce and/or control thermal bias. As shown in FIG. 5A, a thermal bias model 402 may be configured to determine one or more thermal bias-values 500. The thermal bias-values 500 may be utilized by the cooling treatment model 426 to provide model outputs 406, such as cooling control commands 416 and/or engine protection control commands 418. For example, a thermal bias model 402 may be configured to determine a thermal bias-value 500 that includes a thermal bias-initial value $\Delta T(i)$ 502. The thermal bias-initial value 502 may indicate an initial value for thermal bias 320, at an initial time (i). The thermal bias-initial value 502 may be utilized by the cooling treatment model 426 as a thermal bias-value 500. By way of example, a thermal bias-initial value 502 may be determined by an initial value model 420. The thermal bias-initial value 502 may be determined based at least in part on a difference between an upward temperature-value 304 and a downward temperature-value 306. As another example, a thermal bias model 402 may be configured to determine a thermal bias-value 500 that includes a thermal bias-projection value 504. The thermal bias-projection value 504 may indicate a projected value for thermal bias 320, at a future time $(i+t_{FV})$. The thermal bias-projection value 504 may be utilized by the cooling treatment model 426 as a thermal bias-value 500. By way of example, a thermal bias-projection value 504 may be determined by a projection model 424. The thermal bias-projection value 504 may be determined based at least in part on a difference between an upward temperature-value 304 and a downward temperature-value 306.

In addition, or in the alternative to thermal bias-values 500, a thermal bias model 402 may include a thermal bias model 402 configured to determine one or more control limits 506. The one or more control limits may be utilized by the cooling treatment model 426. The one or more control limits 506 may be compared to thermal bias-values 500, for example, to provide model outputs 406, such as cooling control commands 416 and/or engine protection control commands 418. For example, a thermal bias model 402 may be configured to determine a control limit 506 that includes an upper control limit $\Delta T_{UCL}$ 508 for a thermal bias-value 500, such as a thermal bias-initial value 502 and/or a thermal bias-projection value 504. In an exemplary embodiment, a thermal bias-initial value 502 and/or a thermal bias-projection value 504 may be compared to an upper control limit 508. When a thermal bias-value 500 exceeds the upper control limit 508, a cooling treatment may be activated, for example, in an on-ground cooling method, an engine shutdown method, or an engine start-up method. As another example, a thermal bias model 402 may be configured to determine a control limit 506 that includes a lower control limit $\Delta T_{LCL}$ 510 for a thermal bias-value 500. In an exemplary embodiment, a thermal bias-initial value 502 may be compared to a lower control limit 510. When a thermal bias-value 500 such as a thermal bias-initial value 502 is below the lower control limit 510, the cooling treatment may be postponed or deactivated, for example, unless or until the thermal bias-value 500 increases by a sufficient amount to activate the cooling treatment according to one or more conditions of the cooling treatment model 426. Additionally, or in the alternative, a thermal bias-projection value 504 may be compared to a lower control limit 510, and the cooling treatment may be postponed or deactivated when the thermal bias-projection value 504 is below the lower control limit 510, for example, unless or until the thermal bias-projection value 504 increases by a sufficient amount to activate cooling treatment according to one or more conditions of the cooling treatment model 426. The thermal bias-values 500 and/or the control limits 506 may be determined based at least in part on any one or more inputs 404, including, for example, temperature measurements 308 such as an upward temperature-value $T_U(i)$ 304 and/or a downward temperature-value $T_D(i)$ 306, setpoints 410, etc. Additionally, or in the alternative, the thermal bias-values 500 and/or the control limits 506 may be determined from inputs 404 such as operating data 408, setpoints 410, and/or fleet data 414.

In exemplary embodiments, thermal bias 320 may be controlled by performing a cooling treatment. The cooling treatment may include circulating air through at least a portion of the turbomachine 106. Additionally, or in the alternative, the cooling treatment may include rotating a shaft of the turbomachine 106 with a motoring system 254, such as the HP shaft 216 and/or the LP shaft 222. Rotating such a shaft of the turbomachine 106 may reduce thermal bias at least in part by exposing respective circumferential portions of the high pressure spool and/or the low pressure spool to relatively higher-temperature air located in the upward portion of the turbomachine 106. Additionally, or in the alternative, rotating a shaft of the turbomachine 106, such as the HP shaft 216 and/or the LP shaft 222, may cause air to circulate through at least a portion of the turbomachine 106. In some embodiments, a thermal bias model 402 may be configured to control thermal bias 320 in a turbomachine by modulating a cooling treatment based at least in part on a thermal bias-value 500. For example, modulating the cooling treatment may include modulating one or more controllable components of a motoring system 245, for example, to control a rate of air flowing through a motoring air supply line 264 and/or to control a rate of rotation of a shaft of the turbomachine 106, such as a rate of rotation of the HP shaft 216 and/or the LP shaft 222. Additionally, or in the alternative, a cooling treatment may be activated and/or deactivated based at least in part on a thermal bias-value 500.

As shown in FIG. 5B, an exemplary thermal bias model 402, such as a cooling treatment model 426, may be configured to provide model outputs 406. As indicated at block 512, the cooling treatment model 426 may provide model outputs 406 configured to perform a cooling treatment when the turbomachine 106 is in a non-started state. The non-started state may include an engine-operating parameter having been disabled for the turbomachine 106. As shown, an exemplary cooling treatment model 426 may determine model outputs 406 such as cooling control commands 416 and/or engine protection control commands 418. The model outputs 406 may be provided based at least in part on one or more thermal bias-values 500 and/or control limits 506, such as determined as described with reference to FIG. 5A. The cooling treatment model 426 may compare one or more thermal bias-values 500 to one or more control limits 506. The cooling treatment model 426 may determine the one or more model outputs 406 based at least in part on the comparison of the one or more thermal bias-values 500 to one or more control limits 506.

The non-started state of the turbomachine 106 may be determined based at least in part on a status indication from a computing device 112 associated with the cooling treatment model 426, for example, by way of an engine-operating parameter associated with the cooling treatment model 426. Additionally, or in the alternative, a non-started state of the turbomachine 106 may include a status indication from any one or more controllable components associated with the turbomachine 106. Such status indication may be provided directly or indirectly from such a controllable component and/or the computing device 112. A non-started state may include one or more status indications configured to ensure that the turbomachine 106 is not operating prior to performing a cooling treatment. For example, a non-started state of the turbomachine 106 may be determined based at least in part on an indication corresponding to combustion in the combustion chamber 248, fuel flow through a fuel nozzle 252. Additionally, or in the alternative, a non-started state may be determined based at least in part on an indication that a rotation of the turbomachine 106 is below a specified rate of rotation. The indication may include a tachometer value corresponding to a tachometer 276 configured to determine a rate of rotation of one or more rotatable components of the turbomachine 106. For example, the specific rate of rotation for a non-started state may include a rate of rotation of the HP shaft 216 and/or the LP shaft 222, an external gearbox 260, an internal gearbox 262, and/or a radial drive shaft 258. The tachometer value may indicate a rate of rotation commensurate with the turbomachine 106 having been shut down and a rate of rotation of the turbomachine 106 having come to a stop or decreased below the specified rate.

An exemplary cooling treatment model 426 may determine an operating state for a cooling treatment performed to reduce thermal bias in the turbomachine 106, as indicated at block 514 of FIG. 5B. The cooling treatment may include rotating a shaft 201 of a turbomachine 106 with a motoring system 254, thereby causing air to circulate through at least a portion of the turbomachine 106. Possible operating states for a cooling treatment may include active and inactive. In some embodiments, the cooling treatment model 426 may determine whether the cooling treatment has an active state. Additionally, or in the alternative, the cooling treatment model 426 may determine whether the cooling treatment has an inactive state. The cooling treatment may be determined to have an active state (or an inactive state) based at least in part on a status indication from a computing device 112 associated with the cooling treatment model 426 and/or based at least in part on an indication that one or more controllable components associated with the cooling treatment have an active state (or an inactive state).

A status indication from a computing device 112 associated with the cooling treatment model 426 may indicate an active state of the cooling treatment, for example, by way of a control parameter associated with the cooling treatment model 426. Additionally, or in the alternative, an active state may include a status indication from any one or more controllable components associated with the motoring system 254. Such status indication may be provided directly or indirectly from such a controllable component and/or the computing device 112. For example, an active state for the cooling treatment may be determined based at least in part on an indication corresponding to a motor 256, an external gearbox 260, an internal gearbox 262, and/or a motoring air supply valve 268. The indication may include a tachometer value corresponding to a tachometer 276 configured to determine a rate of rotation of a motor 256, an external gearbox 260, an internal gearbox 262, or another component of a motoring system 254. The tachometer value may indicate a rate of rotation commensurate with the cooling treatment, for example, in contrast to a rate of rotation commensurate with startup. By way of example, during a cooling treatment, the tachometer value may be from about 0.01% to about 50% of a rate of rotation used for starting the turbomachine 106, such as from about 0.01% to about 10% of the rate of rotation used for starting the turbomachine 106. Additionally, or in the alternative, an active state for a cooling treatment may be determined based at least in part on a valve position value corresponding to a motoring air supply valve 268. By way of example, during the cooling treatment, the valve position value for the motoring air supply valve 268 may be from about 1% to about 50% of a valve position for the air supply valve 268 used for starting the turbomachine 106, such as from about 1% to about 10% of the valve position used for starting the turbomachine 106.

As shown in FIG. 5B, the one or more thermal bias-values 500 and the one or more control limits 506 that are compared to one another by the cooling treatment model 426 may depend at least in part on the determination as to whether the cooling treatment is active, at block 514, such as a determination of an active state for the cooling treatment. When the cooling treatment model 426 determines an active state for the cooling treatment, at block 516, the cooling treatment model 426 may compare a thermal bias-initial value 502 to a lower control limit $\Delta T_{LCL}$ 510. When the cooling treatment model 426 determines an active state for the cooling treatment, the cooling may continue for a period of time and/or the cooling treatment may be deactivated. When the cooling treatment model 426 determines an inactive state for the cooling treatment, at block 518, the cooling treatment model 426 may compare a thermal bias-initial value 502 to an upper control limit $\Delta T_{UCL}$ 508 for thermal bias. Additionally, or in the alternative, when the cooling treatment model 426 determines an inactive state for the cooling treatment, at block 518, the cooling treatment model 426 may compare a thermal bias-projection value 504 to an upper control limit 508 for thermal bias. When the cooling treatment model 426 determines an inactive state for the cooling treatment, the cooling treatment may be activated and/or the cooling treatment may remain in an inactive state for a period of time.

With an active state for the cooling treatment, at block 516, the cooling treatment model 426 may compare a thermal bias-initial value 502 to a lower control limit 510. When the thermal bias-initial value 502 is less than the lower control limit 510, the cooling treatment model 426 may provide a model output 406 that includes one or more control commands configured to deactivate the cooling treatment, at block 520. The one or more control commands configured to deactivate the cooling treatment, at block 520, may include one or more control commands configured to change an operating state of one or more controllable components of the motoring system 254 and/or the turbomachine 106, such as a motor 256, an external gearbox 260, an internal gearbox 262, and/or a motoring air supply valve 268, thereby deactivating the cooling treatment. Additionally, or in the alternative, the one or more control commands configured to deactivate the cooling treatment, at block 520, may include a control command configured to set an inactive state for the cooling treatment.

When the thermal bias-initial value 502 is less than the lower control limit 510, the cooling treatment model 426 may provide a model output 406 that includes one or more control commands configured to enable engine start, at block 522. An engine start status may have an operating state of enabled or disabled. The one or more control commands configured to enable engine start may be conditioned or contingent upon the cooling treatment model 426 having deactivated the cooling treatment, at block 520, and/or upon the cooling treatment having an inactive operating state. In some embodiments, the cooling treatment model 426 may be configured to set an engine start status to an enabled operating state only when the cooling treatment has an inactive operating state and/or only when the cooling treatment model 426 has deactivated the cooling treatment, at block 520. The one or more control commands configured to deactivate the cooling treatment, at block 520, and the one or more control commands configured to enable engine start, at block 522, may be provided in series or in parallel. In exemplary embodiments, the cooling treatment model 426 may be configured to prevent or condition the engine start status from being set to an enabled operating state unless the cooling treatment has an inactive operating state. The enabled operating state for the engine start status may become effective when the cooling treatment has an inactive operating state. In some embodiments, following the one or more model outputs 406 to deactivate the cooling treatment, at block 520, and/or to enable engine start, at block 522, the cooling treatment model 426 may return to block 514, to determine whether the cooling treatment has an active state and/or to determine whether the cooling treatment has an inactive state. When, at block 522, the engine start status has an enabled operating state, the turbomachine 106 may be started. When commencing startup of the turbomachine 106, and/or after the turbomachine 106 has been started, an operating state of the turbomachine 106 may indicated an operating status that includes a started state, at block 526. The started state may include an engine-operating parameter having been enabled for the turbomachine 106.

Referring again to block 518 of the cooling treatment model 426, when the cooling treatment has an inactive state, the cooling treatment model 426 may compare a thermal bias-initial value 502 to an upper control limit 508, and/or the cooling treatment model 426 may compare a thermal bias-projection value 504 to an upper control limit 508. When the thermal bias-initial value 502 is greater than the upper control limit 508, the cooling treatment model 426 may provide a model output 406 that includes one or more control commands configured to disable engine start, at block 522. Additionally, or in the alternative, when the thermal bias-projection value 504 is greater than the upper control limit 508, the cooling treatment model 426 may provide a model output 406 that includes one or more control commands configured to disable engine start, at block 522. The cooling treatment model 426 may provide the model output 406 that includes one or more control commands configured to disable engine start, at block 524, when either the thermal bias-initial value 502 or the thermal bias-projection value 504 is greater than the upper control limit 508. In this way, the turbomachine 106 may be prevented from starting when the cooling treatment model 426 determines that thermal bias 320 is too great, such as at an initial time (i), or that the thermal bias 320 is projected to be too great, such as at a future time $(i+t_{FV})$. The turbomachine 106 may be prevented from starting by the model output 406 configured to disable engine start, at block 524. For example, the model output 406, at block 524, may include a control command configured to set the engine start status to a disabled operating state when either the thermal bias-initial value 502 or the thermal bias-projection value 504 is greater than the upper control limit 508.

When either the thermal bias-initial value 502 or the thermal bias-projection value 504 is greater than the upper control limit 508, the cooling treatment model 426 may additionally or alternatively provide a model output 406 that includes one or more control commands configured to activate the cooling treatment, at block 528. The one or more control commands configured to activate the cooling treatment, at block 528, may include one or more control commands configured to change an operating state of one or more controllable components of the motoring system 254 and/or the turbomachine 106, such as a motor 256, an external gearbox 260, an internal gearbox 262, and/or a motoring air supply valve 268, thereby activating the cooling treatment. Additionally, or in the alternative, the one or more control commands configured to activate the cooling treatment, at block 528, may include a control command configured to set an active state for the cooling treatment. In some embodiments, activating a cooling treatment may include modulating the cooling treatment based at least in part on a thermal bias-value 500.

The one or more control commands configured to activate the cooling treatment may be conditioned or contingent upon the cooling treatment model 426 having disabled engine start, at block 524, and/or upon engine start having a disabled operating state. In this way, the cooling treatment model 426 may be configured to change the operating state of the cooling treatment to an enabled operating state, and/or to activate the cooling treatment, only when the engine start status has a disabled operating state. The one or more control commands configured to disable the engine start status, at block 524, and the one or more control commands configured to activate the cooling treatment, at block 528, may be provided in series or in parallel. In exemplary embodiments, the cooling treatment model 426 may be configured to prevent or condition the cooling treatment from being activated or changed to an active operating state unless engine start status is set to a disabled operating state. The active operating state for the cooling treatment may become effective when the engine start status has disabled operating state. In some embodiments, following the one or more model outputs 406 to disable engine start, at block 524, and/or to activate the cooling treatment, at block 528, the cooling treatment model 426 may return to block 514, to determine whether the cooling treatment has an active state and/or to determine whether the cooling treatment has an inactive state.

When, at block 516, the cooling treatment model 426 determines that the thermal bias-initial value 502 is greater than or equal to (or not less than) the lower control limit 510, the cooling treatment model may proceed to block 518, to determine whether either of the thermal bias-initial value 502 or the thermal bias-projection value 504 is greater than the upper control limit 508. At block 518, when both the thermal bias-initial value 502 and the thermal bias-projection value 504 is less than or equal to (or not greater than) than the upper control limit 508, the cooling treatment model 426 may provide a model output 406, at block 520. The model output 406 may include one or more control commands configured to deactivate the cooling treatment. The cooling treatment model 426 may be configured to continue the cooling treatment until the thermal bias-initial value 502 and the thermal bias-projection value 504 are less than or equal to (or not greater than) than the upper control limit 508. In some embodiments, the engine start status may be set to an enabled operating state, and an engine start-up method for the turbomachine 106 may be initiated and/or the turbomachine 106 may be started within the time period from an initial time (i) to a future time (i+$t_{FV}$), such as when the thermal bias-value 500 is less than the upper control limit 508, such as when the thermal bias-value 500 is between the lower control limit 510 and the upper control limit 508. The future time (i+$t_{FV}$) may be selected to provide sufficient level of confidence that the thermal bias 320 will not be above the upper control limit 508 if the turbomachine 106 is started within the time period from the initial time (i) to the future time (i+$t_{FV}$). For example, the level of confidence may be determined based at least in part on a variance 318 in the temperature measurements 308, such as a variance 318 in the temperature measurements 308 used to determine the thermal bias-value 500 and/or the upper control limit 508. Additionally, or in the alternative, such level of confidence may be determined based at least in part on a statistical variance, a specified variance, a standard deviation, a confidence interval, or the like.

In some embodiments, the turbomachine 106 may be prevented from being started when the engine start status is set to a disabled operating state. The computing device 112 and/or the cooling treatment model 426 may include control logic that prevents the turbomachine 106 from starting when the engine start status is set to a disabled operating state. Additionally, or in the alternative, the computing device 112 and/or the cooling treatment model 426 may include control logic that allows the turbomachine 106 to be started only when the engine start status is set to an enabled operating state. The disabled operating state may cause the cooling treatment model 426 to provide one or more outputs 406 that physically prevent the turbomachine 106 from being started when the engine start status is set to a disabled operating state, and/or that allow the turbomachine 106 to be started when the engine start status is set to an enabled operating state. For example, the turbomachine 106 may be prevented from being started by a control command that causes the motoring system 254 to exhibit an operating state and/or a physical configuration that prevents the turbomachine 106 from being started. Additionally, or in the alternative, the turbomachine 106 may be physically capable of being started when a control command causes the motoring system 254 to exhibit an operating state and/or a physical configuration that allows the turbomachine 106 to be started. Such a physical configuration may include a position of one or more gears, clutches, or the like of an external gearbox 260 and/or an internal gearbox 262. For example, with a disabled operating state, the motoring system 254 may exhibit a gear ratio that is suitable for cooling treatment, but unsuitable for starting the turbomachine 106. Additionally, or in the alternative, such a physical configuration may include a position of a motoring air supply valve 268. For example, with a disabled operating state, the motoring air supply valve 268 may exhibit a valve position that is suitable for cooling treatment, but unsuitable for starting the turbomachine 106. In this way, the turbomachine 106 may be prevented from rotating at high rate of speed such during an engine start-up in the event of a thermal bias-value 500 that exceeds an upper control limit 508 and/or when the cooling treatment is active.

Figure 6A:
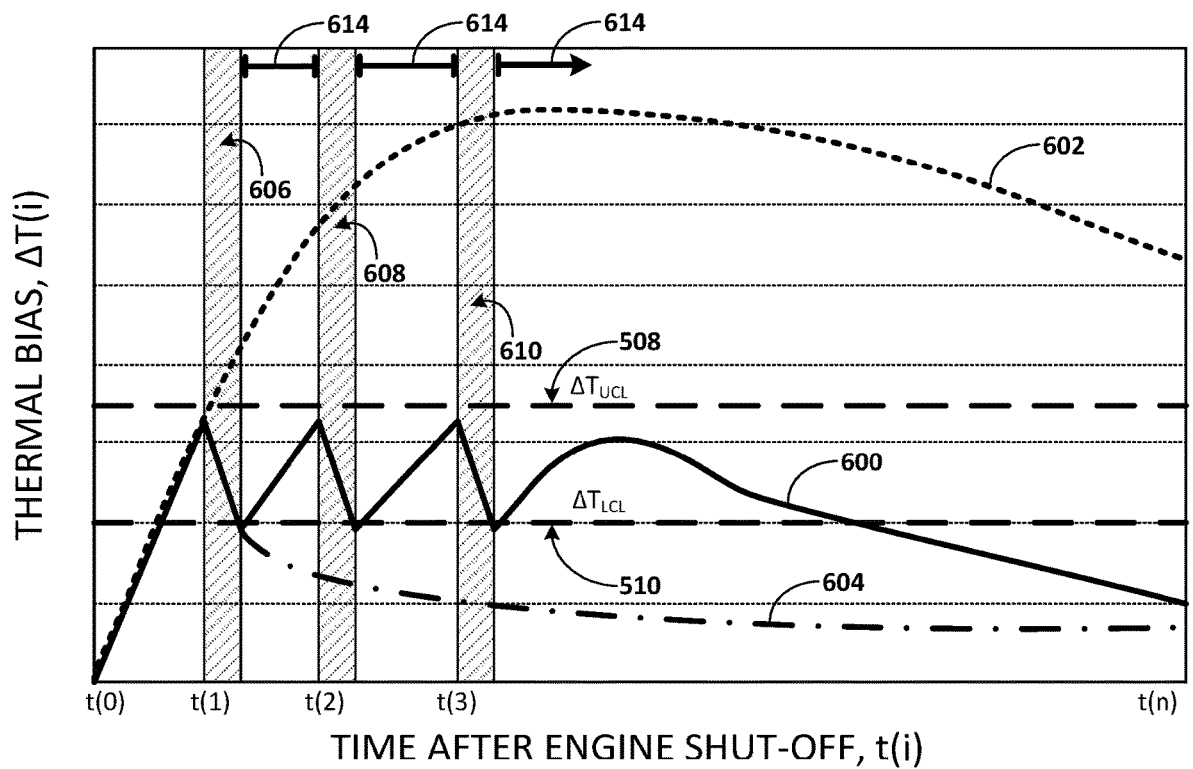
FIGS. 6A and 6B respectively show a chart depicting an example of thermal bias as a function of time after engine shut-off, and a corresponding chart depicting an example residual heat as a function of time after engine shut-off.
Figure 6B:
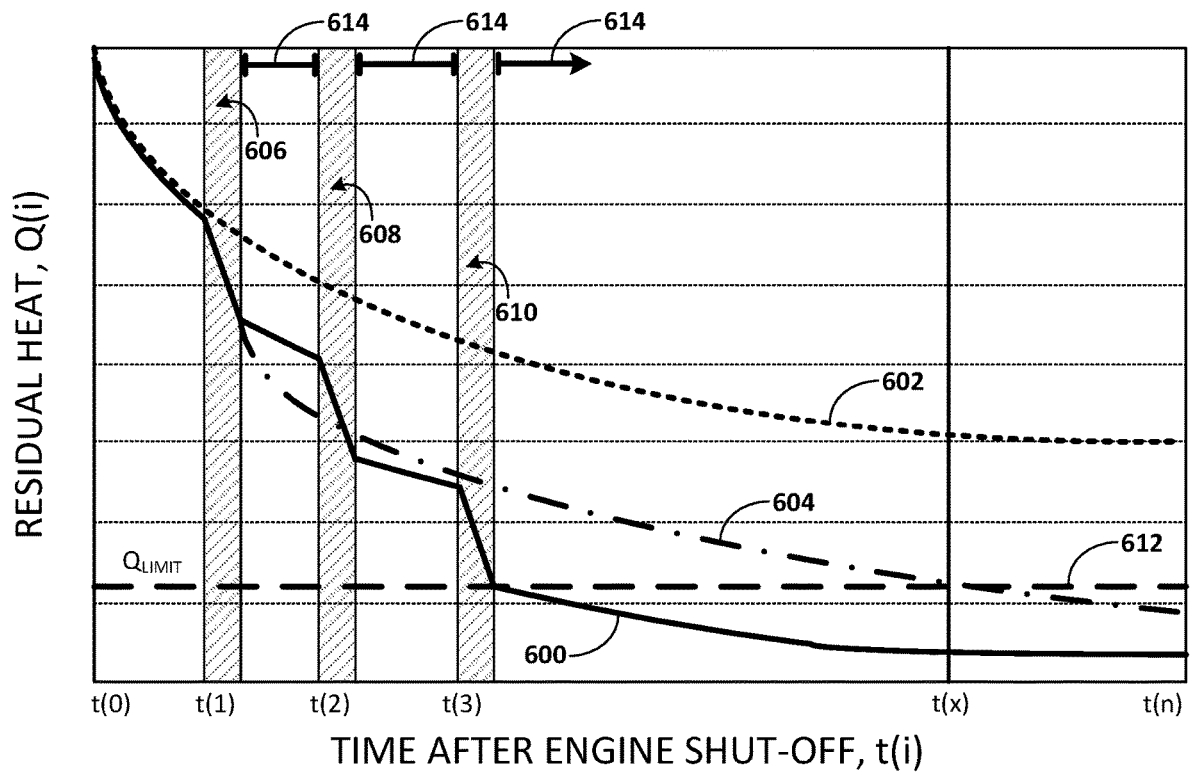
Figure 6C:
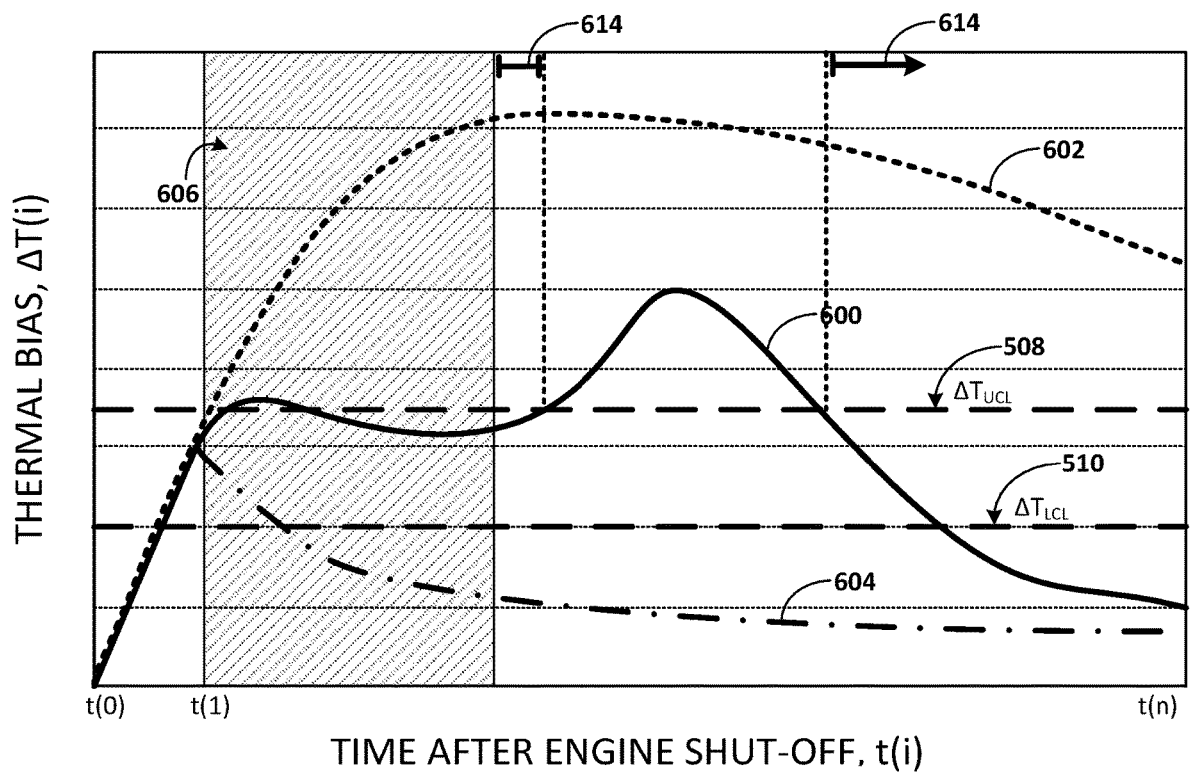
FIGS. 6C and 6D respectively show a chart depicting another example of thermal bias as a function of time after engine shut-off, and a corresponding chart depicting an example residual heat as a function of time after engine shut-off.
Figure 6D:
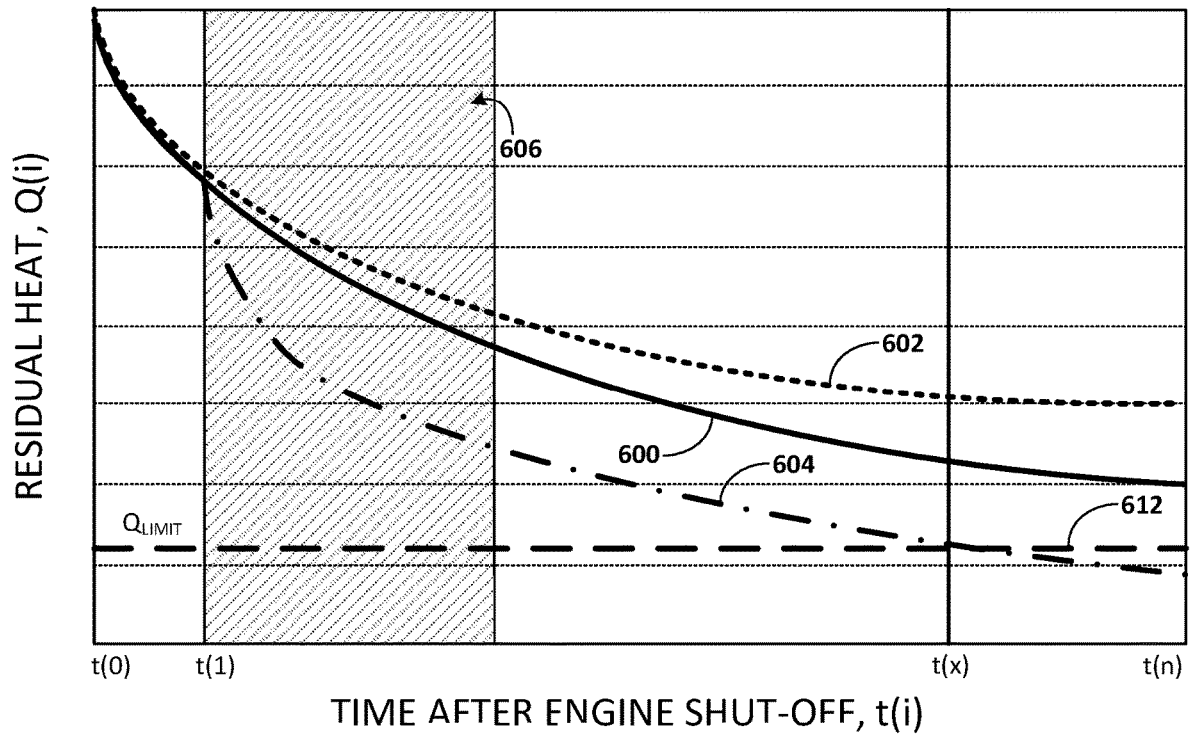

Referring now to FIGS. 6A and 6B, and 6C and 6D, exemplary methods of controlling thermal bias are further described. FIG. 6A shows a chart depicting an example thermal bias-value 500 as a function of time after engine shut-off of a turbomachine 106. FIG. 6B shows a chart corresponding to FIG. 6A, depicting residual heat in one or more areas of a turbomachine 106 as a function of time after engine shut-off of the turbomachine 106. FIG. 6C shows a chart depicting another example thermal bias-value 500 as a function of time after engine shut-off of a turbomachine 106. FIG. 6D shows a chart corresponding to FIG. 6C, depicting residual heat in one or more areas of a turbomachine 106 as a function of time after engine shut-off of the turbomachine 106. As illustrated by a solid line 600 in FIGS. 6A and 6B, and FIGS. 6C and 6D, thermal bias may be controlled using a thermal bias model 402, such as a cooling treatment model 426. An exemplary uncontrolled thermal bias 320 is illustrated by a dashed line 602 in FIGS. 6A and 6B, and FIGS. 6C and 6D. By way of comparison, another exemplary method of controlling thermal bias is illustrated by a dash-and-dotted line 604 in FIGS. 6A and 6B, and FIGS. 6C and 6D.

The method of controlling thermal bias depicted in FIGS. 6A and 6B, and 6C and 6D, may include one or more cooling periods 606 during which a cooling treatment may be provided. As shown in FIG. 6A, a cooling period 606 may include performing a cooling treatment that provides a relatively rapid decrease in thermal bias-value 500. In some embodiments, thermal bias may be controlled at least in part using a plurality of cooling periods 606, as shown, for example, in FIG. 6A. As shown in FIG. 6A, the thermal bias-value 500 may be reduced by some amount, for example, from about an upper control limit $\Delta T_{UCL}$ 508 to a lower control limit $\Delta T_{LCL}$ 510, over a period of time corresponding to the cooling period 606. After a cooling period, the thermal bias-value 500 may increase, for example as a result of residual heat that still exists within the turbomachine 106. As the thermal bias-value 500 approaches the upper control limit 508, a next cooling period may begin, again reducing the thermal bias-value 500, for example, from about an upper control limit 508 to a lower control limit 510. In some embodiments, sequential cooling periods 606 may be provided until a sufficient amount of residual heat is removed from the turbomachine 106 and/or until commencing an engine startup. Additionally, or in the alternative, as shown in FIG. 6C, a single cooling period 606 may be provided. In some embodiments, the cooling period 606 may include providing a controlled amount of cooling, for example, to control thermal bias-value 500 to a setpoint and/or a range. For example, the thermal bias-value 500 may be controlled to a setpoint such as an upper control limit 508, and/or to a range, such as a range defined by an upper control limit 508 and a lower control limit 510.

By way of example, as shown in FIGS. 6A and 6B, and 6C and 6D, a turbomachine 106 may be shut-off at a time t(0). At the time of engine shut-off, the turbomachine 106 may exhibit a low thermal bias-value 500 (FIGS. 6A and 6C) that increases due to a high amount of residual heat in the turbomachine (FIGS. 6B and 6D). When uncontrolled, the thermal bias-value 500 may increase beyond the upper control limit $\Delta T_{UCL}$ 508, as shown in FIGS. 6A and 6C. The thermal bias 320 may be attributable at least in part to asymmetric cooling within the turbomachine after engine shut-off. For example, asymmetric cooling may be attributable to hot gasses rising to upward portions of the turbomachine 106, which may transfer heat to such upward portions and/or may allow downward portions to cool more than upward portions. Over time, and uncontrolled thermal bias 320 may gradually decrease, for example, as residual heat within the turbomachine declines as shown in FIGS. 6B and 6D. When uncontrolled, at a time t(n), the thermal bias 320 may exhibit a thermal bias-value may remain above the upper control limit 508. As shown by the dash-and-dotted line 604, thermal bias 320 may be controlled, for example, using a motoring system 254 to rotate a shaft 201 of the turbomachine 106, such as the HP shaft 216 and/or the LP shaft 222 (FIG. 2). Rotation of the HP shaft 216 may cause the high pressure spool 218 to rotate. Rotation of the LP shaft 222 may cause the low pressure spool 224 to rotate (FIG. 2). The dash-and-dotted line 604 may represent a cooling treatment that is activated and continued until a time when enough residual heat has been removed from the turbomachine 106, as shown in FIGS. 6B and 6D at a time t(x). The solid line 600 represents a method of controlling thermal bias performed, for example, according to a thermal bias model 402, such as a cooling treatment model 426, as described with reference to FIGS. 4, 5A, and 5B.

Referring to FIGS. 6A and 6B, as illustrated by the solid line 600 in FIGS. 6A and 6B, a first cooling period 606 may begin at a time t(1). The time t(1) may correspond to a determination, at block 518 of FIG. 5B, that a thermal bias-initial value 502 or a thermal bias-projection value 504 is greater than the upper control limit $\Delta T_{UCL}$ 508. For example, as shown in FIG. 6A, the first cooling period 606 may begin prior to the thermal bias-value 500 reaching the upper control limit 508, indicating that the cooling treatment model 426 determined the thermal bias-projection value 504 is greater than the upper control limit 508. The cooling period may continue for a first cooling period 606 indicated by a first shaded region in FIGS. 6A and 6B, for example, until such time as the cooling treatment model 426 determines that the thermal bias-initial value 502 is less than the lower control limit $\Delta T_{LCL}$ 510 (FIG. 5B, block 516). As shown in FIG. 6A, the cooling period 606 may end when the thermal vias 320 is slightly below the lower control limit 510.

As shown in FIG. 6B, the first cooling period 606 may reduce the amount of residual heat in one or more regions of the turbomachine 106. Remaining residual heat within the turbomachine 106 may cause thermal bias to increase, as shown in FIG. 6A. At a second time t(2), a second cooling period 608 may begin, as indicated by a second shaded region in FIGS. 6A and 6B, for example, when the cooling treatment model 426 determines the thermal bias-projection value 504 is greater than the upper control limit 508 (FIG. 5B). The second cooling period 608 may continue until such time as the cooling treatment model 426 determines that the thermal bias-initial value 502 is less than the lower control limit 510 (FIG. 5B, block 516). The second cooling period 608 may further reduce the amount of residual heat in one or more regions of the turbomachine 106, as shown in FIG. 6B. Remaining residual heat within the turbomachine 106 may cause thermal bias to increase, as shown in FIG. 6A. At a third time t(3), a third cooling period 610 may begin, as indicated by a third shaded region in FIGS. 6A and 6B, for example, when the cooling treatment model 426 determines the thermal bias-projection value 504 is greater than the upper control limit 508 (FIG. 5B, block 518). The third cooling period 610 may continue until such time as the cooling treatment model 426 determines that the thermal bias-initial value 502 is less than the lower control limit 510 (FIG. 5B, block 516). The third cooling period 610 may further reduce the amount of residual heat in one or more regions of the turbomachine 106, as shown in FIG. 6B. Remaining residual heat within the turbomachine 106 may cause thermal bias to increase, as shown in FIG. 6A.

Referring to FIGS. 6C and 6D, as illustrated by the solid line 600 in FIGS. 6A, a cooling period 606 may begin at a time t(1). The time t(1) may correspond to a determination, at block 518 of FIG. 5B, that a thermal bias-initial value 502 or a thermal bias-projection value 504 is greater than the upper control limit $\Delta T_{UCL}$ 508. For example, as shown in FIG. 6C, the cooling period 606 may begin prior to the thermal bias-value 500 reaching the upper control limit 508, indicating that the cooling treatment model 426 determined the thermal bias-projection value 504 is greater than the upper control limit 508. During the cooling period 606, the thermal bias-value 500 may be controlled based at least in part on a setpoint, such as the upper control limit 508. The thermal bias model 402 may provide a controlled amount of cooling, for example, during the cooling period 606. The thermal bias model 402 may provide model outputs 406, such as cooling control commands 416. The cooling control commands 416 may control the thermal bias-value 500 to a setpoint such as an upper control limit 508, and/or to a range, such as a range defined by an upper control limit 508 and a lower control limit 510. For example, as shown in FIG. 6C, the thermal bias may exhibit thermal bias-values 500 at and/or below the upper control limit 508, and/or between the upper control limit 508 and the lower control limit 510.

In some embodiments, the cooling period 606 may continue until a sufficient amount of residual heat has been removed from the turbomachine 106. For example, as shown in FIG. 6D, after the cooling period 606 had ended, the thermal bias may exhibit thermal bias-values 500 that exceed the upper control limit 508 for a period of time, but then decrease below the upper control limit 508, for example, as residual heat dissipates from the turbomachine 106. In some embodiments, the cooling period 606 may end when sufficient residual heat has been removed from the turbomachine 106 such that the thermal bias is projected to exhibit a thermal bias-value that is below the upper control limit 508 at a scheduled engine start time, for example, even with an initial increase in thermal bias upon ending the cooling period 606.

It will be appreciated that any number of cooling periods 606 may be provided, for example, until such time as the thermal bias no longer increases to the extent that the thermal bias-initial value 502 and/or the thermal bias-projection value 504 is greater than the upper control limit 508 (FIG. 5B, block 518). By way of example, as shown in FIGS. 6A, the thermal bias-value 500 may increase but remain below the upper control limit 508 after a number of cooling periods 606, such as after the third cooling period 610 as shown in FIGS. 6A and 6B. Additionally, or in the alternative, as shown, in FIG. 6B, the residual heat in one or more regions of the turbomachine 106 may decrease below a residual heat-threshold $Q_{LIMIT}$ 612, such that the remaining residual heat may be insufficient to increase the thermal bias-value 500 above the upper control limit 508. It will be appreciated that the three cooling periods 606, 608, 610 described with reference to FIGS. 6A and 6B are provided by way of example only, and that any number of cooling periods 606 may be provided in accordance with the present disclosure. The specific number of cooling periods 606 may depend on a variety of parameters associated with the turbomachine 106, such as material properties and physical configuration of the turbomachine 106. Additionally, or in the alternative, the specific number of cooling periods 606 may depend on a variety of parameters associated with the thermal bias control module 400, such as the amount of residual heat in one or more regions of the turbomachine 106, the rate of residual heat removal during the respective cooling periods 606, and the duration of the respective cooling periods 606.

In some embodiments, as illustrated in FIGS. 6A and 6B, thermal bias 320 may be controlled more efficiently and/or more rapidly when using a plurality of cooling periods 606, such as according to a thermal bias model 402, such as a cooling treatment model 426. The more efficient and/or more rapid cooling treatment may be realized relative to a cooling treatment that is activated and continued until a time when the residual heat in the turbomachine 106 is reduced below a residual heat-threshold $Q_{LIMIT}$ 612 such that the remaining residual heat may be insufficient to increase the thermal bias-value 500 above the upper control limit 508, as indicated in FIGS. 6A and 6B by a dash-and-dotted line 604. For example, in some embodiments, by allowing the thermal bias 320 to increase to some extent (e.g., to the upper control limit 508) prior to initiating a cooling period 606, the passage of time prior to initiating a cooling period 606 may allow residual heat to be conducted from inward regions of the turbomachine 106 in a direction towards toward outward regions of the turbomachine 106. Such passage of time prior to initiating the cooling period 606 may thereby provide a relatively higher temperature gradient between regions of the turbomachine 106 that have a heat transfer relationship with airflow that passes through the turbomachine 106 during the cooling treatment. Additionally, or in the alternative, by deactivating the cooling treatment when the thermal bias 320 has decreased to some extent (e.g., to the lower control limit 510), time and energy consumed by the cooling treatment may be postponed, for example, during a period following a previous cooling period 606 and/or preceding a next cooling period 606 when the temperature gradient is relatively low between regions of the turbomachine 106 that have a heat transfer relationship with airflow that passes through the turbomachine 106 during the cooling treatment. In some embodiments, the upper control limit 508 and/or the lower control limit 510 may be selected at least in part to provide improved cooling, including, for example, improved heat dissipation during cooling periods 606 and/or improved energy efficiency for the cooling treatment.

In some embodiments, a method of controlling thermal bias may include and/or provide for a plurality of engine start windows 614 between respective cooling periods. An engine start window 614 may include a period of time within which the turbomachine 106 may be started, such as when the thermal bias-value 500 is below a setpoint, such as an upper control limit 508. During an engine start window 614, cooling may be deactivated (FIG. 5B, block 520), for example, to assure that the turbomachine is not started during a cooling period 606. Additionally, or in the alternative, during an engine start window 614, an engine start status for the turbomachine 106 may have an operating state of enabled (FIG. 5B, block 522).

In some embodiments, temperature measurements may be determined periodically with incremental rotations of a shaft 201 of a turbomachine 106, such as at intervals of about ($\pi$)-radians, such as at intervals of ($2\pi$)-radians, such as at intervals of from about ($\pi/6$)-radians to about ($2\pi$)-radians, such as at intervals of from about ($\pi/2$)-radians to about ($3\pi/2$)-radians, such as at intervals of from about ($5\pi/6$)-radians to about ($7\pi/6$)-radians, such at intervals of about ($2\pi$)-radians+/−($\pi/4$)-radians, or such as at intervals of about ($\pi$)-radians+/−($\pi/4$)-radians, as well as at any multiple of such an interval.

In some embodiments, an exemplary the upper control limit 508 (FIGS. 5A and 5B) may be from about 10 degrees Celsius (° C.) to about 30° C., such as from about to about 10° C. to about 20° C., such as from about to about 15° C. to about 25° C., or such as from about to about 20° C. to about 30° C. The upper control limit 508 may be at least about 10° C., such as at least about 15° C., such as at least about 20° C., or such as at least about 25° C.

In some embodiments, an exemplary lower control limit 510 (FIGS. 5A and 5B) may be from about 1° C. to about 10° C., such as from about to about 2° C. to about 8° C., or such as from about to about 4° C. to about 6° C., such as from about to about 6° C. to about 8° C. The upper control limit 508 may be at least about 2° C., such as at least about 4° C., such as at least about 6° C., or such as at least about 8° C.

In some embodiments, the future time (i+$t_{FV}$) (FIGS. 5A and 5B) for a thermal bias-projection value 504 may be from about 1 minute to about 10 minutes, such as from about 2 minutes to about 8 minutes, such as from about 3 minutes to about 5 minutes. The future time (i+$t_{FV}$) may be at least about 2 minutes, such as at least about 5 minutes, or such as at least about 8 minutes.

In some embodiments, a cooling period 606 (FIGS. 6A-6D) may be from about 1 minute to about 10 minutes, such as from about 2 minutes to about 8 minutes, such as from about 3 minutes to about 5 minutes. The cooling period 606 may be at least about 2 minutes, such as at least about 5 minutes, or such as at least about 8 minutes. The cooling period 606 may be less than about 9 minutes, such as less than about 7 minutes, such as less than about 5 minutes, or such as at least about 3 minutes.

In some embodiments, a number of cooling periods 606 (FIGS. 6A-6D) performed may be from 1 to about 5, such as from about 2 to about 5, or such as from about 3 to about 5. The number of cooling periods 606 may be at least 3, such as at least 4, or such as at least 5.

In some embodiments, a total cooling time, determined from a sum of the cooling periods 606 (FIGS. 6A-6D) may be from about 3 minutes to about 20 minutes, such as from about 5 minutes to about 15 minutes, or such as from about 8 minutes to about 12 minutes. The total cooling time may be at least about 3 minutes, such as at least about 5 minutes, such as at least about 10 minutes, or such as at least about 15 minutes. The total cooling time may be less than about 15 minutes, such as less than about 10 minutes, or such as less than about 5 minutes.

In some embodiments, an engine start windows 614 (FIGS. 6A-6C) may be from about 1 minute to about 10 minutes, such as from about 2 minutes to about 8 minutes, such as from about 3 minutes to about 5 minutes. The cooling period 606 may be at least about 2 minutes, such as at least about 5 minutes, or such as at least about 8 minutes.

In some embodiments, without cooling, a bowed rotor condition may exist for a period of from about 30 minutes to about 180 minutes, such as from about 60 minutes to about 160 minutes, such as from about 90 minutes to about 120 minutes. Without cooling, a bowed rotor condition may exist for at least about 30 minutes, such as at least about 60 minutes, such as at least about 90 minutes, such as at least about 120 minutes, or such as at least about 160 minutes.

Figure 7:
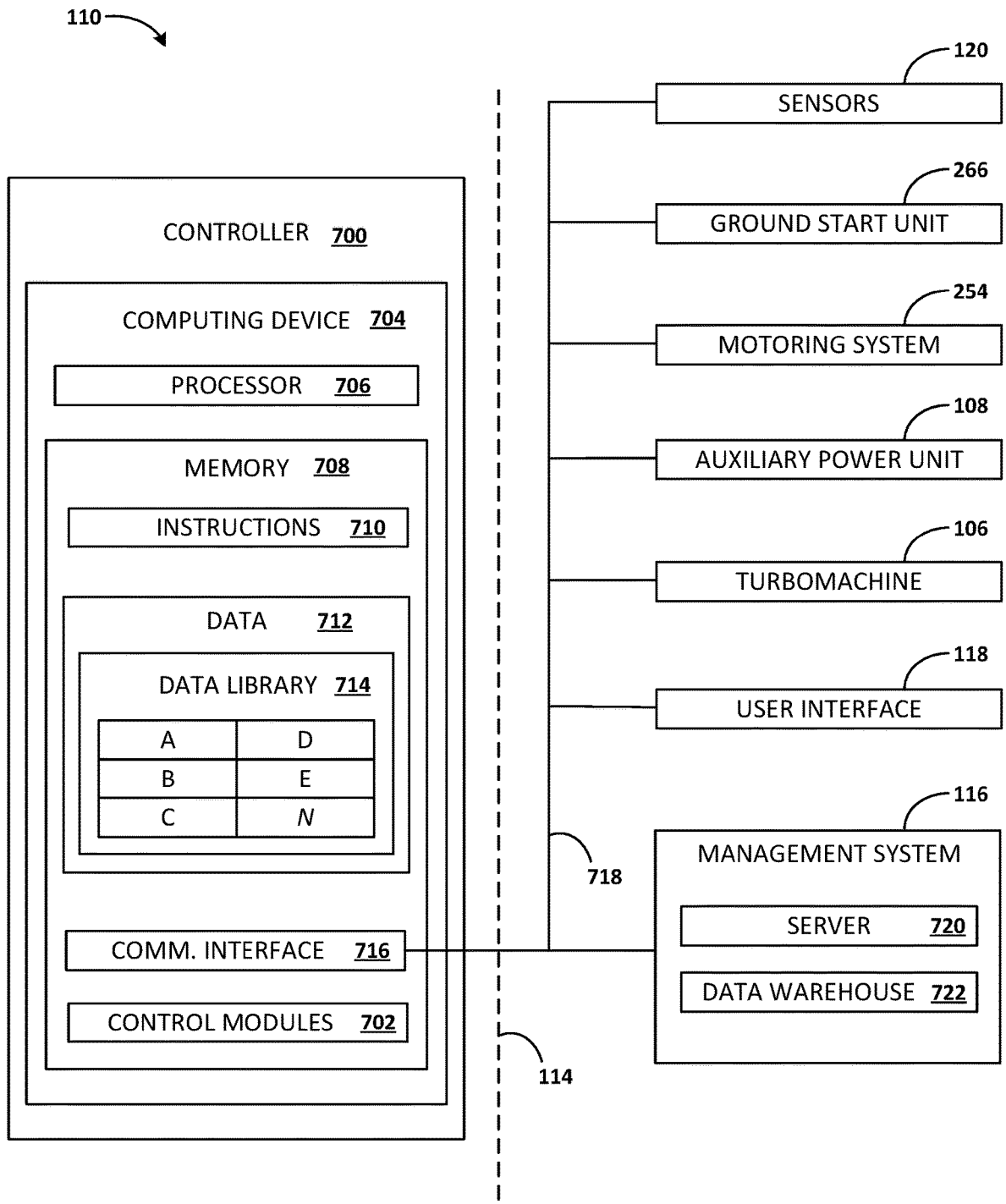
FIG. 7 schematically depicts an exemplary control system.

Referring now to FIG. 7, an exemplary engine control system 110 is further described. An engine control system 110 may be configured to perform one or more control operations associated with an aircraft 100, a turbomachine 106, a motoring system 254, an auxiliary power unit 108, and/or a ground start unit 266. The control operations may include, one or more control commands associated with a cooling treatment, such as in connection with an on-ground cooling method, an engine shut-down method, and/or an engine start-up method.

As shown in FIG. 7, an exemplary engine control system 110 may include a controller 700, such as an electronic engine controller, a full-authority digital engine control (FADEC) device, or the like. The controller 700 may include one or more control modules 702 configured to cause the controller 700 to perform one or more control operations. The one or more control modules 702 may include control logic executable to provide control commands configured to control one or more controllable components associated with an aircraft 100, a turbomachine 106, a motoring system 254, an auxiliary power unit 108, and/or a ground start unit 266. For example, a control module 702 may be configured to provide one or more control commands executable to control operation of one or more components of an aircraft 100, a turbomachine 106, a motoring system 254, an auxiliary power unit 108, and/or a ground start unit 266. The control commands may be configured to perform a method of controlling thermal bias in accordance with the present disclosure.

The controller 700 may be communicatively coupled with one or more components of an aircraft 100, a turbomachine 106, a motoring system 254, an auxiliary power unit 108, and/or a ground start unit 266. The controller 700 may be communicatively coupled with one or more sensors 120, such as temperature sensors, of a turbomachine 106. For example, the controller 700 may be communicatively coupled with one or more high pressure compressor-sensors 270, one or more high pressure turbine-sensors 272, and/or one or more low pressure turbine-sensors 274. Additionally, or in the alternative, the controller 700 may be communicatively coupled with a tachometer 276 of a motoring system 254. The controller 700 may also be communicatively coupled with a management system 116 and/or a user interface 118.

The controller 700 may include one or more computing devices 704, which may be located locally or remotely relative to a turbomachine 106, a motoring system 254, and/or an auxiliary power unit 108. The one or more computing devices 704 may include one or more processors 706 and one or more memory devices 708. The one or more processors 706 may include any suitable processing device, such as a microprocessor, microcontroller, integrated circuit, logic device, and/or other suitable processing device. The one or more memory devices 708 may include one or more computer-readable media, including but not limited to non-transitory computer-readable media, RAM, ROM, hard drives, flash drives, and/or other memory devices 708.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 708 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 708 may store information accessible by the one or more processors 706, including computer-executable instructions 710 that can be executed by the one or more processors 706. The instructions 710 may include any set of instructions which when executed by the one or more processors 706 cause the one or more processors 706 to perform operations, including operations associated with cooling treatments configured to control thermal bias, such as in connection with an on-ground cooling method, an engine shut-down method, and/or an engine start-up method.

The memory devices 708 may store data 712 accessible by the one or more processors 706. The data 712 can include current or real-time data 712, past data 712, or a combination thereof. The data 712 may be stored in a data library 714. As examples, the data 712 may include data 712 associated with or generated by an aircraft 100, a turbomachine 106, a motoring system 254, an auxiliary power unit 108, and/or a ground start unit 266. Additionally, or in the alternative, the data 712 may include data 712 associated with or generated by one or more sensors 120. Additionally, or in the alternative, the data 712 may include data 712 associated with or generated by one or more control modules 702, such as thermal bias control module 400. Such data 712 may include model outputs 406, such as cooling commands 416 and/or engine protection control commands 418. The data 712 may also include other data sets, parameters, outputs, information, associated with controlling thermal bias, control modules 702, an aircraft 100, a turbomachine 106, a motoring system 254, an auxiliary power unit 108, and/or a ground start unit 266.

The one or more computing devices 704 may also include a communication interface 716, which may be used for communications with a communication network 114 via wired or wireless communication lines 718. The communication interface 716 may include any suitable components for interfacing with one or more network(s), including for example, transmitters, receivers, ports, controllers, antennas, and/or other suitable components. The communication interface 716 may allow the computing device 704 to communicate with various nodes on the communication network 114, such as nodes associated with the control modules 702, the aircraft 100, the turbomachine 106, the motoring system 254, the auxiliary power unit 108, the ground start unit 266, the management system 116, and/or a user interface 118. The communication network 114 may include, for example, a local area network (LAN), a wide area network (WAN), SATCOM network, VHF network, a HF network, a Wi-Fi network, a WiMAX network, a gatelink network, and/or any other suitable communication network 114 for transmitting messages to and/or from the controller 700 across the communication lines 718. The communication lines 718 of communication network 114 may include a data bus or a combination of wired and/or wireless communication links.

The communication interface 716 may allow the computing device 704 to communicate with various components of an aircraft 100 and/or various components of a turbomachine 106 communicatively coupled with the communication interface 716 and/or communicatively coupled with one another. The communication interface 716 may additionally or alternatively allow the computing device 704 to communicate with the management system 116 and/or the user interface 118. The management system 116 may include a server 720 and/or a data warehouse 722. As an example, at least a portion of the data 712 may be stored in the data warehouse 722, and the server 720 may be configured to transmit data 712 from the data warehouse 722 to the computing device 704, and/or to receive data 712 from the computing device 704 and to store the received data 712 in the data warehouse 722 for further purposes. The server 720 and/or the data warehouse 722 may be implemented as part of an engine control system 110 and/or as part of the management system 116.

Now turning to FIGS. 8A-8D exemplary methods 800 of controlling thermal bias in a turbomachine 106 will be described. Exemplary methods may be performed at least in part by an engine control system 110, and/or one or more controllers 700, such as an electronic engine controller, a full-authority digital engine control (FADEC) device, or the like. Additionally, or in the alternative, exemplary methods may be performed at least in part by one or more control modules 702, such as a thermal bias control module 400.

Figure 8A:
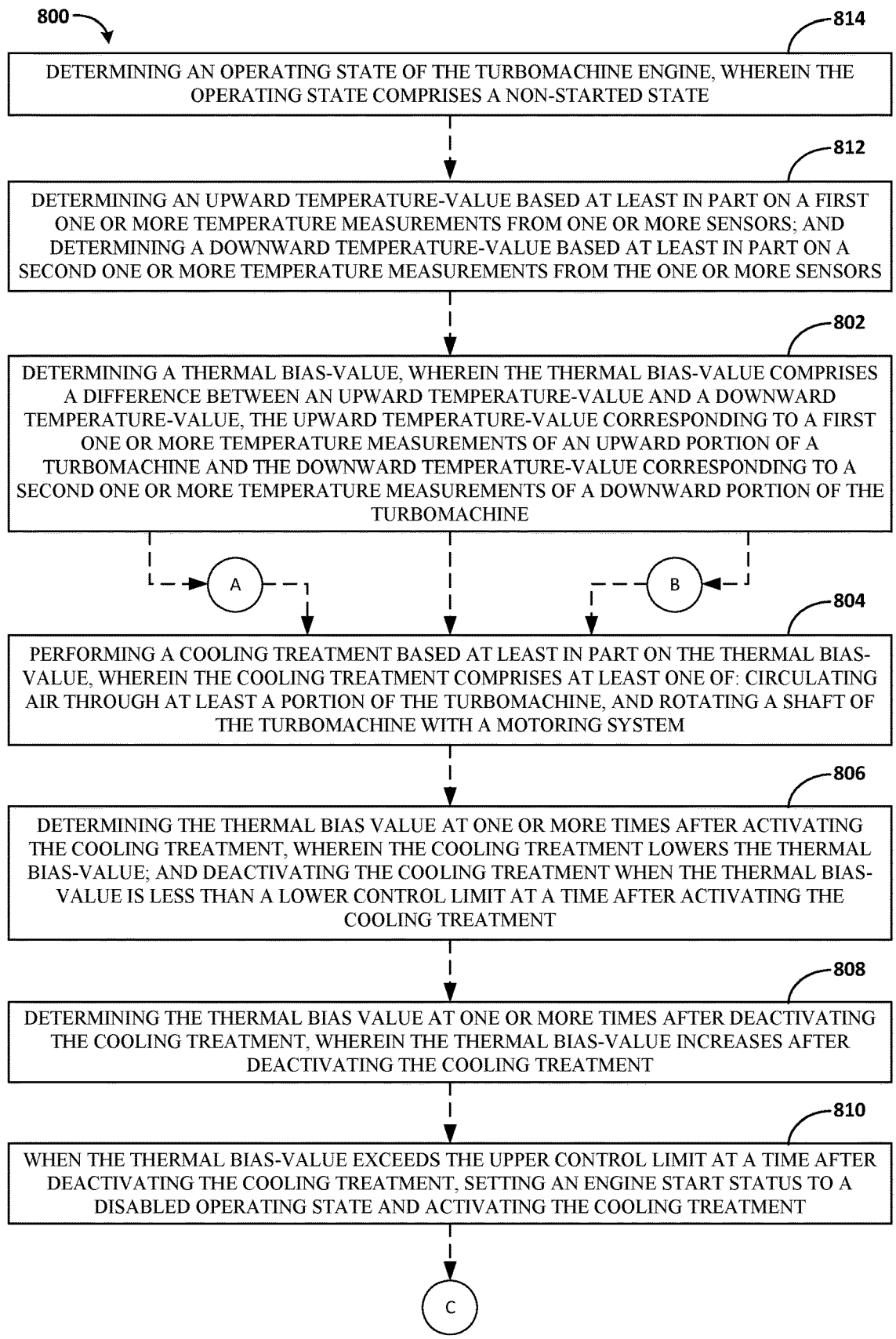
FIGS. 8A-8D show flow charts depicting an exemplary method of controlling thermal bias.

As shown in FIG. 8A, an exemplary method 800 may include, at block 802, determining a thermal bias-value 500. The thermal bias value may be determined when the turbomachine 106 is in a non-started state. The non-started state may include an engine-operating parameter having been disabled for the turbomachine 106. The thermal bias-value 500 may include a difference between an upward temperature-value 304 and a downward temperature-value 306. The upward temperature-value 304 may correspond to a first one or more temperature measurements 308 of an upward portion of the turbomachine 106. The downward temperature-value 306 corresponding to a second one or more temperature measurements of a downward portion of the turbomachine 106. At block 804, the exemplary method 800 may include performing a cooling treatment based at least in part on the thermal bias-value 500. The cooling treatment may include at least one of: circulating air through at least a portion of the turbomachine 106, and rotating a shaft of the turbomachine 106 with a motoring system 254. In some embodiments, rotating the shaft of the turbomachine 106 causes the air to circulate through the at least a portion of the turbomachine 106. In some embodiments, performing the cooling treatment may include modulating the cooling treatment based at least in part on the thermal bias-value. Additionally, or in the alternative, performing the cooling treatment may include activating a cooling treatment when the thermal bias-value 500 exceeds an upper control limit 508. The cooling treatment may be activated when the turbomachine is in a non-started state. The non-started state may include an engine-operating parameter having been disabled for the turbomachine 106. The cooling treatment may include rotating a shaft 201 of the turbomachine 106 with a motoring system 254. Rotating the shaft 201 of the turbomachine 106 may cause air to circulate through at least a portion of the turbomachine 106.

In some embodiments, the exemplary method 800 may include, at block 806, determining the thermal bias-value 500 at one or more times after activating the cooling treatment. The cooling treatment may lower the thermal bias-value 500. Block 806 of the exemplary method 800 may additionally or alternatively include deactivating the cooling treatment when the thermal bias-value 500 is less than a lower control limit 510 at a time after activating the cooling treatment. At block 808, an exemplary method 800 may include determining the thermal bias-value 500 at one or more times after deactivating the cooling treatment. The thermal bias-value 500 may increase after deactivating the cooling treatment. The exemplary method 800 may include, at block 810, setting an engine start status to a disabled operating state and activating the cooling treatment, when the thermal bias-value 500 exceeds the upper control limit 508 at a time after deactivating the cooling treatment. Additionally, or in the alternative, at block 812, the exemplary method 800 may include determining the upward temperature-value 304 based at least in part on a first one or more temperature measurements 308 from one or more sensors 120.

Additionally, or in the alternative, at block 812, the exemplary method 800 may include determining the downward temperature-value 306 based at least in part on a second one or more temperature measurements 308 from the one or more sensors 120. Additionally, or in the alternative, at block 814, the exemplary method 800 may include determining an operating state of the turbomachine 106. The operating state may include a non-started state. The non-started state may include an engine-operating parameter having been disabled for the turbomachine 106.

Figure 8B:
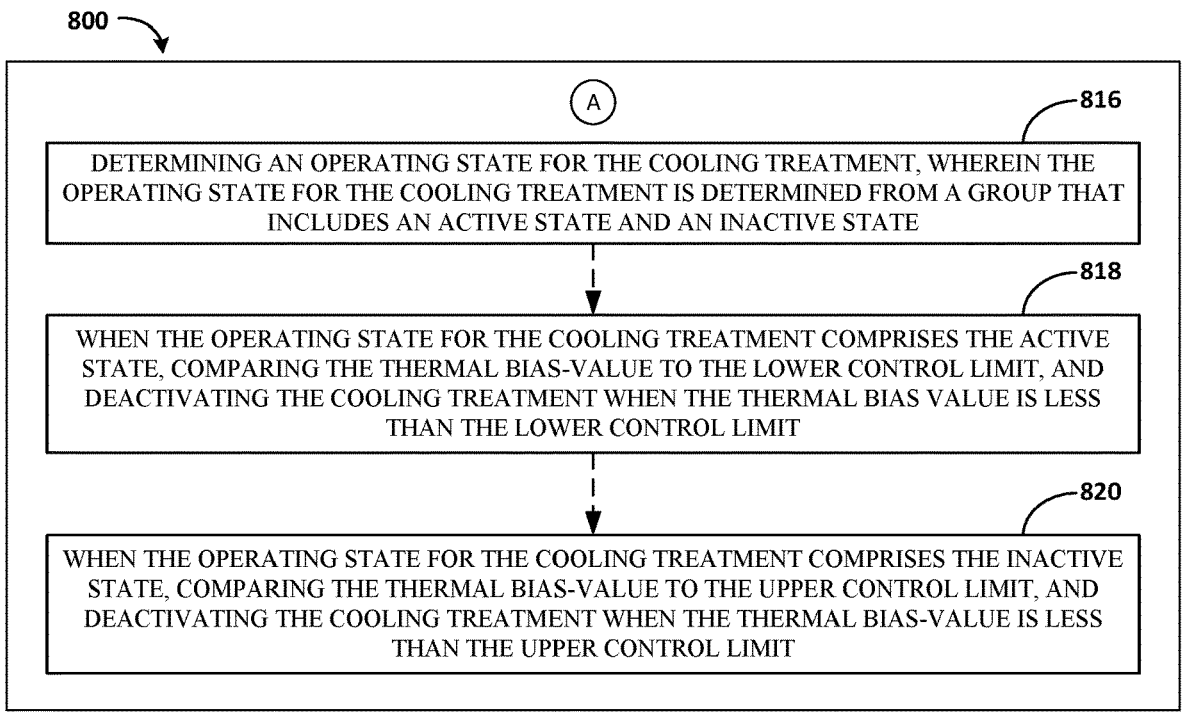

As shown in FIG. 8B, the exemplary method 800 may include, at block 816, determining an operating state for the cooling treatment. The operating state for the cooling treatment may be determined from a group that includes an active state and an inactive state. At block 818, the exemplary method 800 may include comparing the thermal bias-value 500 to the lower control limit 510 when the operating state for the cooling treatment includes the active state, and deactivating the cooling treatment when the thermal bias-value 500 is less than the lower control limit 510. Additionally, or in the alternative, the exemplary method 800 may include, at block 820, comparing the thermal bias-value 500 to the upper control limit 508 when the operating state for the cooling treatment includes the inactive state, and deactivating the cooling treatment when the thermal bias-value 500 is less than the upper control limit 508.

Figure 8C:
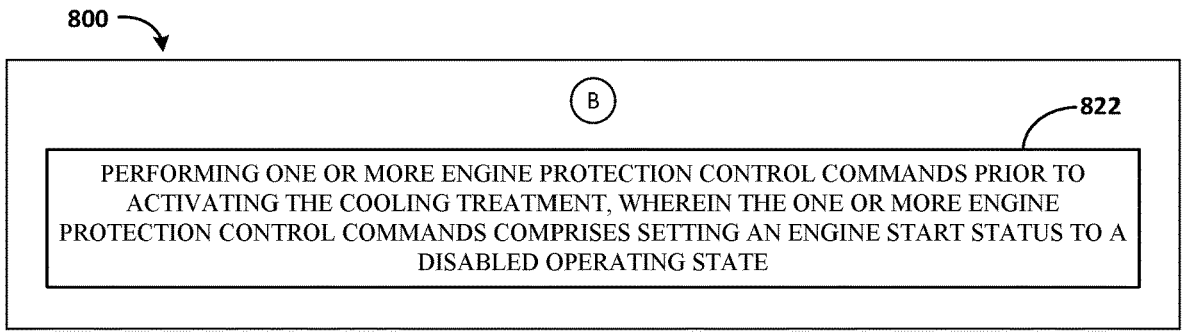
Figure 8D:
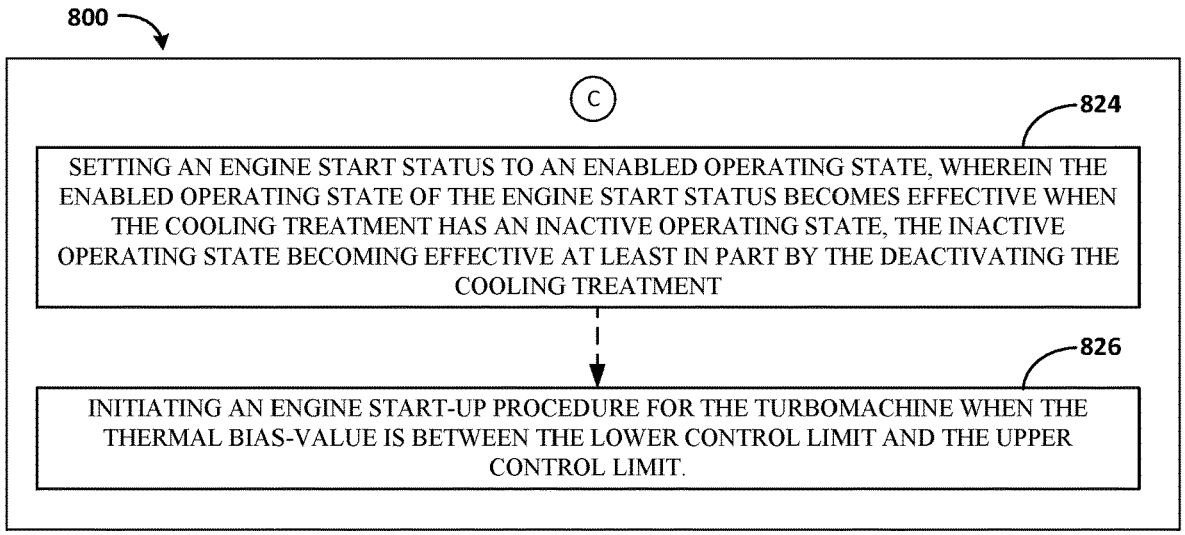

As shown in FIG. 8C, the exemplary method 800 may include, at block 822, performing one or more engine protection control commands 418 prior to activating the cooling treatment. The one or more engine protection control commands 418 may include setting an engine start status to a disabled operating state. Additionally, or in the alternative, as shown in FIG. 8D, the exemplary method 800 may include, at block 824, setting an engine start status to an enabled operating state, with the enabled operating state of the engine start status becoming effective when the cooling treatment has an inactive operating state, and the inactive operating state becoming effective at least in part by deactivating the cooling treatment. At block 826, the exemplary method 800 may include initiating an engine start-up method for the turbomachine 106 when the thermal bias-value is between the lower control limit and the upper control limit. With the engine start-up method initiated, the motoring system 254 may be utilized to start up the turbomachine 106. Upon having started the turbomachine 106, the operating status of the turbomachine 106 may transition from a non-started state to a started state.

Thus, the present disclosure provides systems and methods that may mitigate rotor bow or bowed rotor conditions in a turbomachine. The presently disclosed systems and methods may include activating and deactivating cooling treatments one or more times, for example, as part of an on-ground cooling method, when an initial/current thermal bias is less than a lower control limit, thereby providing for more efficient cooling treatments and/or a more efficient reduction in thermal bias while still providing good protection from bowed rotor conditions. Additionally, or in the alternative, the presently disclosed systems and methods may include activating a cooling treatment when either an initial or current value, or a projection value, for thermal bias exceeds an upper control limit, thereby providing good control of thermal bias when the thermal bias is sufficiently high or projected to be sufficiently high. Additionally, or in the alternative, the presently disclosed systems and methods may include starting a turbomachine even when a current value for thermal bias is above a lower control limit, such as even when a thermal bias-value is increasing, for example, during a time period prior to a time when a projection value for the thermal bias exceeds the upper control limit. In this way, the presently disclosed systems and methods for thermal bias control may provide a series of time periods when the turbomachine may be started even when the turbomachine has a sufficient level of residual heat that may lead to a thermal bias value that exceeds the upper control limit. As such, the presently disclosed systems and methods may provide increased flexibility in scheduling start-up times for turbomachines, for example, to accommodate schedule changes to a flight itinerary for an aircraft powered by one or more turbomachines that include engine control systems and motoring systems configured to control thermal bias in accordance with the present disclosure.

Further aspects of the present disclosure are provided by the subject matter of the following clauses:

An engine control system comprising a memory device and a processor, wherein the memory device comprises computer-executable instructions, which when executed by the processor, cause the engine control system to perform a method of controlling thermal bias in a turbomachine during a non-started state, the method comprising: determining a thermal bias-value, wherein the thermal bias-value comprises a difference between an upward temperature-value and a downward temperature-value, the upward temperature-value corresponding to a first one or more temperature measurements of an upward portion of the turbomachine and the downward temperature-value corresponding to a second one or more temperature measurements of a downward portion of the turbomachine; and performing a cooling treatment based at least in part on the thermal bias-value, wherein the cooling treatment comprises at least one of: circulating air through at least a portion of the turbomachine, and rotating a shaft of the turbomachine with a motoring system.

The engine control system of any clause herein, wherein the thermal bias-value comprises at least one of a thermal bias-initial value and a thermal bias-projection value.

The engine control system of any clause herein, wherein performing the cooling treatment comprises: modulating the cooling treatment based at least in part on the thermal bias-value.

The engine control system of any clause herein, wherein performing the cooling treatment comprises: activating the cooling treatment when the thermal bias-value exceeds an upper control limit.

The engine control system of any clause herein, wherein the instructions, when executed, cause the engine control system to further perform the method, the method comprising: determining the thermal bias-value at one or more times after activating the cooling treatment, wherein the cooling treatment decreases the thermal bias-value; and deactivating the cooling treatment when the thermal bias-value is less than a lower control limit at a time after activating the cooling treatment.

The engine control system of any clause herein, wherein the instructions, when executed, cause the engine control system to further perform the method, the method comprising: determining the thermal bias-value at one or more times after deactivating the cooling treatment, wherein the thermal bias-value increases after deactivating the cooling treatment; and setting an engine start status to an enabled operating state, wherein the enabled operating state of the engine start status becomes effective when the cooling treatment has an inactive operating state, the inactive operating state becoming effective at least in part by the deactivating the cooling treatment.

The engine control system of any clause herein, wherein the instructions, when executed, cause the engine control system to further perform the method, the method comprising: initiating an engine start-up method for the turbomachine when the thermal bias-value is between the lower control limit and the upper control limit.

The engine control system of any clause herein, wherein the instructions, when executed, cause the engine control system to further perform the method, the method comprising: when the thermal bias-value exceeds the upper control limit at a time after deactivating the cooling treatment, setting an engine start status to a disabled operating state, and activating the cooling treatment.

The engine control system of any clause herein, wherein the instructions, when executed, cause the engine control system to further perform the method, the method comprising: performing one or more engine protection control commands prior to activating the cooling treatment, wherein the one or more engine protection control commands comprises setting an engine start status to a disabled operating state.

The engine control system of any clause herein, wherein the instructions, when executed, cause the engine control system to further perform the method, the method comprising: determining an operating state for the cooling treatment, wherein the operating state for cooling treatment is determined from a group that includes an active state and an inactive state; and when the operating state for cooling treatment comprises the active state, comparing the thermal bias-value to a lower control limit, and deactivating the cooling treatment when the thermal bias-value is less than the lower control limit; and when the operating state for the cooling treatment comprises the inactive state, comparing the thermal bias-value to the upper control limit, and deactivating the cooling treatment when the thermal bias-value is less than the upper control limit.

The engine control system of any clause herein, wherein the instructions, when executed, cause the engine control system to further perform the method, the method comprising: determining an operating state of the turbomachine, wherein the operating state comprises a non-started state.

The engine control system of any clause herein, wherein the cooling treatment comprises: rotating the shaft of the turbomachine with a motoring system, wherein rotating the shaft of the turbomachine causes the air to circulate through the at least a portion of the turbomachine.

The engine control system of any clause herein, wherein rotating the shaft of the turbomachine with the motoring system comprises at least one of: rotating a high pressure shaft and rotating a low pressure shaft.

The engine control system of any clause herein, wherein rotating the shaft of the turbomachine with the motoring system comprises: rotating the high pressure shaft without rotating the low pressure shaft; or rotating the low pressure shaft without rotating the high pressure shaft.

The engine control system of any clause herein, wherein rotating the high pressure shaft comprises rotating at least one of: a high pressure compressor, a combustion chamber, and a high pressure turbine.

The engine control system of any clause herein, wherein rotating the low pressure shaft comprises rotating at least one of: a low pressure compressor and a low pressure turbine.

The engine control system of any clause herein, wherein rotating the shaft of the turbomachine with the motoring system comprises: supplying motoring air to a motoring system.

The engine control system of any clause herein, wherein the motoring air causing the motoring system to rotate a radial drive shaft coupled to the shaft of the turbomachine.

The engine control system of any clause herein, wherein supplying motoring air to a motoring system comprises supplying motoring air to a motor configured to rotate the high pressure shaft and/or the low pressure shaft of the turbomachine.

The engine control system of any clause herein, wherein supplying motoring air to a motoring system comprises supplying motoring air to one or more regions of the turbomachine, the motoring air circulating within and/or flowing through the one or more regions of the turbomachine.

The engine control system of any clause herein, wherein supplying motoring air to one or more regions of the turbomachine comprises supplying motoring air to the high pressure compressor.

The engine control system of any clause herein, wherein supplying motoring air to one or more regions of the turbomachine causes the shaft of the turbomachine to rotate.

The engine control system of any clause herein, wherein supplying motoring air comprises at least partially opening a motoring air supply valve, wherein at least partially opening the motoring air supply valve allows the motoring air to flow from at least one of: an auxiliary power unit, a ground start unit, and an additional turbomachine.

The engine control system of any clause herein, wherein the instructions, when executed, cause the engine control system to further perform the method, the method comprising: determining the upward temperature-value based at least in part on a first one or more temperature measurements from one or more sensors; and determining the downward temperature-value based at least in part on a second one or more temperature measurements from the one or more sensors.

The engine control system of any clause herein, wherein determining the upward temperature-value comprises determining the first one or more temperature measurements with an upward temperature sensor located at an upward portion of a core engine of the turbomachine; and wherein determining the downward temperature-value comprises determining the second one or more temperature measurements with a downward temperature sensor located at a downward portion of the core engine of the turbomachine.

The engine control system of any clause herein, wherein determining the upward temperature-value comprises determining the first one or more temperature measurements with the shaft of the turbomachine oriented at $(2\pi)$-radians, $+/-(\pi/3)$-radians, on a circumferential axis; and wherein determining the downward temperature-value comprises determining the second one or more temperature measurements with the shaft of the turbomachine oriented at $(\pi)$-radians, $+/-(\pi/3)$-radians, on the circumferential axis.

The engine control system of any clause herein, wherein the instructions, when executed, cause the engine control system to further perform the method, the method comprising: determining at least one of the upward temperature-value and the downward temperature-value based at least in part on one or more temperature measurements obtained during or after an initial period of rotating the shaft of the turbomachine with the motoring system, the initial period commencing prior to activating the cooling treatment.

A turbomachine, comprising: core engine comprising a shaft, and a compressor stage and a turbine stage coupled to the shaft; one or more sensors respectively configured to determine temperature measurements from at least one of an upward portion of the turbomachine and a downward portion of the turbomachine; a motoring system coupled to the shaft, the motoring system configured to rotate the shaft; and an engine control system comprising a memory device and a processor, wherein the memory device comprises computer-executable instructions, which when executed by the processor, cause the engine control system to perform a method of controlling thermal bias in the turbomachine, the method comprising: determining a thermal bias-value, wherein the thermal bias-value comprises a difference between an upward temperature-value and a downward temperature-value, the upward temperature-value corresponding to a first one or more temperature measurements of the upward portion of the turbomachine and the downward temperature-value corresponding to a second one or more temperature measurements of the downward portion of the turbomachine; and performing a cooling treatment based at least in part on the thermal bias-value, wherein the cooling treatment comprises at least one of: circulating air through at least a portion of the turbomachine, and rotating a shaft of the turbomachine with the motoring system.

The turbomachine of any clause herein, wherein the turbomachine comprises an engine control system configured according to any clause herein.

A non-transitory computer-readable medium comprising computer-executable instructions, which, when executed by a processor operably coupled to an engine control system, cause the engine control system to: determine a thermal bias-value, wherein the thermal bias-value comprises a difference between an upward temperature-value and a downward temperature-value, the upward temperature-value corresponding to a first one or more temperature measurements of an upward portion of the turbomachine and the downward temperature-value corresponding to a second one or more temperature measurements of a downward portion of the turbomachine; and perform a cooling treatment based at least in part on the thermal bias-value, wherein the cooling treatment comprises at least one of: circulating air through at least a portion of the turbomachine, and rotating a shaft of the turbomachine with a motoring system.

The computer-readable medium of any clause herein, comprising computer-executable instructions, which, when executed by a processor operably coupled to an engine control system, cause the engine control system to perform a method of controlling thermal bias in accordance with the engine control system of any clause herein.

A method of controlling thermal bias in a turbomachine during a non-started state, the method comprising: determining a thermal bias-value, wherein the thermal bias-value comprises a difference between an upward temperature-value and a downward temperature-value, the upward temperature-value corresponding to a first one or more temperature measurements of an upward portion of the turbomachine and the downward temperature-value corresponding to a second one or more temperature measurements of a downward portion of the turbomachine; and performing a cooling treatment based at least in part on the thermal bias-value, wherein the cooling treatment comprises at least one of: circulating air through at least a portion of the turbomachine, and rotating a shaft of the turbomachine with a motoring system.

The method of any clause herein, wherein the method is performed using an engine control system and/or a turbomachine of any clause herein.

A method of controlling thermal bias in a turbomachine during a non-started state, wherein the method is performed using an engine control system and/or a turbomachine of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine control system comprising a non-transitory memory device and a processor, wherein the memory device comprises computer-executable instructions, which when executed by the processor, cause the engine control system to perform a method of controlling thermal bias in a turbomachine during a non-started state, the method comprising:
   determining, using a thermal bias model, a thermal bias-value based on a plurality of temperatures measured about a circumference of a shaft of the turbomachine;
   determining, using a projection model, a projection value for the thermal bias-value at a future time, wherein the projection value corresponds to a defined time period, the defined time period selected at least in part to allow the cooling treatment to be initiated before the thermal bias-value exceeds an upper control limit;
   generating a model output based on the thermal bias-value, the model output structured to alter an operating condition associated with the turbomachine; and
   performing a cooling treatment based at least in part on the model output, wherein the cooling treatment comprises at least one of: circulating air through at least a portion of the turbomachine, and rotating the shaft of the turbomachine with a motoring system.

2. The engine control system of claim 1, wherein the instructions, when executed, cause the engine control system to further perform the method, the method comprising:
   receiving at least one model input, the model input being at least one of sensor data, setpoints, counter time, or fleet data including past operating data;
   wherein the determining the thermal bias-value is based on the at least one model input.

3. The engine control system of claim 1, wherein the instructions, when executed, cause the engine control system to further perform the method, the method comprising:
   performing one or more engine protection control commands prior to activating the cooling treatment, wherein the one or more engine protection control commands comprises setting an engine start status to a disabled operating state.

4. The engine control system of claim 1, wherein the determining the thermal bias-value includes determining, using an initial value model, an initial value for the thermal bias-value, and wherein determining the thermal bias-value includes using ambient condition as input.

5. The engine control system of claim 4, wherein the initial value model includes a machine-learned function.

6. The engine control system of claim 1, wherein the determining the thermal bias-value includes determining, using a rate of change model, a rate of change for the thermal bias-value.

7. The engine control system of claim 1, wherein the performing the cooling treatment is based at least in part on a cooling treatment model, and wherein the method further includes:
   determining, using the cooling treatment model, at least one of a setpoint, gain, filter, feedback parameter, cascade hierarchy, or transfer function.

8. The engine control system of claim 1, wherein the instructions, when executed, cause the engine control system to further perform the method, the method comprising:
updating at least one of an initial value model, a rate of change model, the projection model, or a cooling treatment model.

9. The engine control system of claim 1, wherein the determining the thermal bias-value includes executing a machine-learned model to provide the model output.

10. The engine control system of claim 1, wherein the performing the cooling treatment comprises modulating the cooling treatment based at least in part on the thermal bias-value.

11. The engine control system of claim 1, wherein the thermal bias value includes an upward temperature of the turbomachine and a downward temperature of the turbomachine.

12. The engine control system of claim 1, wherein the cooling treatment comprises rotating the shaft of the turbomachine with the motoring system, wherein rotating the shaft of the turbomachine causes the air to circulate through the at least a portion of the turbomachine.

13. The engine control system of claim 1, wherein the instructions, when executed, cause the engine control system to further perform the method, the method comprising:
determining, using the thermal bias model, a confidence score indicative of a level of confidence of the model output.

14. The engine control system of claim 1, wherein the determining the thermal bias value includes executing each of an initial value model, a rate of change model, and the projection model.

15. The engine control system of claim 1, wherein the performing the cooling treatment comprises activating the cooling treatment when the thermal bias-value exceeds the upper control limit.

16. A turbomachine, comprising:
a core engine comprising a shaft, and a compressor stage and a turbine stage coupled to the shaft;
one or more sensors respectively configured to determine temperature measurements from at least one of an upward portion of the turbomachine and a downward portion of the turbomachine;
a motoring system coupled to the shaft, the motoring system configured to rotate the shaft; and
an engine control system comprising a non-transitory memory device and a processor, wherein the memory device comprises computer-executable instructions, which when executed by the processor, cause the engine control system to perform a method of controlling thermal bias in the turbomachine during a non-started state, the method comprising:
determining, using a thermal bias model, a thermal bias-value based on a plurality of temperatures measured about a circumference of the shaft of the turbomachine;
determining, using a projection model, a projection value for the thermal bias-value at a future time, wherein the projection value corresponds to a defined time period, the defined time period selected at least in part to allow the cooling treatment to be initiated before the thermal bias-value exceeds an upper control limit;
generating a model output based on the thermal bias-value, the model output structured to alter an operating condition associated with the turbomachine; and
performing a cooling treatment based at least in part on the model output, wherein the cooling treatment comprises at least one of: circulating air through at least a portion of the turbomachine, and rotating the shaft of the turbomachine with the motoring system.

17. A method of controlling thermal bias in a turbomachine during a non-started state, the method comprising:
determining, using a thermal bias model, a thermal bias-value based on a plurality of temperatures measured about a circumference of a shaft of the turbomachine;
determining, using a projection model, a projection value for the thermal bias-value at a future time, wherein the projection value corresponds to a defined time period, the defined time period selected at least in part to allow the cooling treatment to be initiated before the thermal bias-value exceeds an upper control limit;
generating a model output based on the thermal bias-value, the model output structured to alter an operating condition associated with the turbomachine; and
performing a cooling treatment based at least in part on the model output, wherein the cooling treatment comprises at least one of: circulating air through at least a portion of the turbomachine, and rotating the shaft of the turbomachine with a motoring system.

* * * * *